(12) United States Patent
Kitazato

(10) Patent No.: US 9,179,198 B2
(45) Date of Patent: Nov. 3, 2015

(54) RECEIVING APPARATUS, RECEIVING METHOD, AND PROGRAM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 13/238,065

(22) Filed: Sep. 21, 2011

(65) Prior Publication Data

US 2012/0081607 A1 Apr. 5, 2012

Related U.S. Application Data

(60) Provisional application No. 61/497,344, filed on Jun. 15, 2011, provisional application No. 61/388,999, filed on Oct. 1, 2010.

(51) Int. Cl.
- *H04N 21/6543* (2011.01)
- *H04N 21/436* (2011.01)
- *H04H 60/13* (2008.01)
- *H04H 60/80* (2008.01)

(52) U.S. Cl.
CPC ........... *H04N 21/6543* (2013.01); *H04H 60/13* (2013.01); *H04N 21/43615* (2013.01); *H04H 60/80* (2013.01)

(58) Field of Classification Search
CPC ................................................ H04N 21/8166
USPC .......................................................... 725/32
See application file for complete search history.

(56) References Cited

U.S. PATENT DOCUMENTS

| 7,584,491 | B2 * | 9/2009 | Bruckner et al. ............... 725/36 |
| 2003/0033157 | A1 | 2/2003 | Dempski et al. |
| 2003/0037068 | A1 | 2/2003 | Thomas et al. |
| 2003/0086003 | A1 | 5/2003 | Koga |

(Continued)

FOREIGN PATENT DOCUMENTS

| EP | 1 389 020 A1 | 2/2004 |
| JP | 2003-9113 | 1/2003 |

(Continued)

OTHER PUBLICATIONS

U.S. Appl. No. 13/422,203, filed Mar. 16, 2012, Kitazato, et al.

(Continued)

*Primary Examiner* — Jefferey Harold
*Assistant Examiner* — Justin Sanders
(74) *Attorney, Agent, or Firm* — Oblon, McClelland, Maier & Neustadt, L.L.P.

(57) ABSTRACT

A receiving apparatus includes: a reception portion configured to receive audio-visual content being transmitted; a trigger extraction portion configured to extract trigger information for controlling an application program for execution either by the receiving apparatus proper or by an external device connected thereto in conjunction with the audio-visual content, the application program being transmitted along with the audio-visual content; an apparatus proper control portion configured such that if a command indicated by the extracted trigger information is destined for the receiving apparatus proper, the apparatus proper control portion controls performance of the application program in accordance with the command; and an external device processing portion configured such that if the command indicated by the extracted trigger information is destined for the external device, the external device processing portion transfers the command to the external device.

15 Claims, 21 Drawing Sheets

(56) References Cited

U.S. PATENT DOCUMENTS

| | | | |
|---|---|---|---|
| 2004/0031058 A1* | 2/2004 | Reisman | 725/112 |
| 2006/0168635 A1* | 7/2006 | Terashima et al. | 725/110 |
| 2006/0194535 A1 | 8/2006 | Houldsworth et al. | |
| 2006/0242692 A1* | 10/2006 | Thione et al. | 726/9 |
| 2007/0169164 A1 | 7/2007 | Marilly et al. | |
| 2008/0028074 A1 | 1/2008 | Ludvig | |
| 2008/0094310 A1* | 4/2008 | Shindo et al. | 345/1.1 |
| 2008/0120638 A1 | 5/2008 | King et al. | |
| 2008/0247543 A1* | 10/2008 | Mick et al. | 380/201 |
| 2009/0087161 A1 | 4/2009 | Roberts et al. | |
| 2009/0125946 A1 | 5/2009 | Fukuda | |
| 2009/0313663 A1 | 12/2009 | Kitazato et al. | |
| 2009/0320064 A1 | 12/2009 | Soldan et al. | |
| 2010/0205628 A1 | 8/2010 | Davis et al. | |
| 2012/0011261 A1 | 1/2012 | Hirano et al. | |

FOREIGN PATENT DOCUMENTS

| | | |
|---|---|---|
| JP | 2003-18583 | 1/2003 |
| JP | 2003-530033 | 10/2003 |
| JP | 2006-50237 | 2/2006 |
| JP | 2007-116669 | 5/2007 |
| JP | 2008-53916 | 3/2008 |
| JP | 2009-118343 | 5/2009 |
| JP | 2009-118343 A | 5/2009 |
| JP | 2010-288192 | 12/2010 |
| WO | WO 2010/109860 A1 | 9/2010 |

OTHER PUBLICATIONS

U.S. Appl. No. 13/452,376, filed Apr. 20, 2012, Kitahara, et al.
U.S. Appl. No. 13/554,688, filed Jul. 20, 2012, Kitazato, et al.
U.S. Appl. No. 12/980,917, filed Dec. 29, 2010, Dewa.
U.S. Appl. No. 13/071,551, filed Mar. 25, 2011, Kitazato, et al.
U.S. Appl. No. 13/075,440, filed Mar. 30, 2011, Yamagishi, et al.
U.S. Appl. No. 13/081,566, filed Apr. 7, 2011, Kitazato, et al.
U.S. Appl. No. 13/071,238, Mar. 24, 2011, Yamagishi.
U.S. Appl. No. 13/071,559, filed Mar. 25, 2011, Yamagishi, et al.
U.S. Appl. No. 13/071,560, filed Mar. 25, 2011, Yamagishi.
U.S. Appl. No. 13/107,604, filed Mar 13, 2011, Dewa.
U.S. Appl. No. 13/080,866, Apr. 6, 2011, Kitazato, et al.
U.S. Appl. No. 13/239,871, filed Sep. 22, 2011, Kitazato.
U.S. Appl. No. 13/238,277, filed Sep. 21, 2011, Kitazato.
U.S. Appl. No. 13/238,080, filed Sep. 21, 2011, Kitazato, et al.
U.S. Appl. No. 13/238,138, filed Sep. 21, 2011, Kitazato.
U.S. Appl. No. 13/238,264, filed Sep. 21, 2011, Kitazato.
U.S. Appl. No. 13/220,231, filed Aug. 29, 2011, Kitahara, et al.
International Search Report issued Jul. 17, 2012, in PCT/JP2012/064806 with English translation.
Kentaro Yamazaki, "Open House 2011. Linking the TV and the SNS [Hybridcast]", http://av.watch.impress.co.jp/docs/news/20110524_448049.html, published on web May 24, 2011, 6 pages.
International Search Report issued Dec. 20, 2011 in Application No. PCT/JP2011/071567 (With English Translation).
International Search Report issued Dec. 20, 2011 in Application No. PCT/JP2011/071568 (With English Translation).
International Search Report issued Dec. 27, 2011 in Application No. PCT/JP2011/071569 (With English Translation).
International Search Report issued Dec. 27, 2011 in Application No. PCT/JP2011/071570 (With English Translation).
Hideaki Kimata, "Movement on MPEG 3DAV toward International Standardization of 3D Video", IPSJ SIG Notes, vol. 2005—AVM—48, 2005, No. 23, 10 pages (With English Abstract).
International Search Report issued Nov. 29, 2011, in Patent Application No. PCT/JP2011/071566 filed Sep. 22, 2011 (with English-language translation).
Extended European Search Report issued Feb. 6, 2014 in Patent Application No. 11828915.6.
Office Action issued Feb. 20, 2014 in Japanese Patent Application No. 2013-520530 (with English language translation).
Extended European Search Report issued Feb. 26, 2014 in Patent Application No. 11828910.7.
Extended European Search Report issued Mar. 6, 2014 in Patent Application No. 11828911.5.
Extended European Search Report issued May 8, 2014 in Patent Application No. 11828912.3.
Extended European Search Report issued May 12, 2014 in Patent Application No. 11828914.9.
Extended European Search Report issued Oct. 1, 2014 in Patent Application No. 12800685.5.
Office Action issued Nov. 27, 2014 in Japanese Patent Application No. 2013-520530.

* cited by examiner

FIG.6

TRIGGER WITH "Register" COMMAND

| Item | No of Bits | explanation |
|---|---|---|
| Trigger_id | 8 | IDENTIFICATION OF TRIGGER INFORMATION OF THE SAME CONTENT. |
| Target_device_type | 8 | DEVICE TYPE TARGETED BY THE COMMAND. IN THE CASE OF 0xFF, THE COMMAND IS SHOWN TO BE COMMON TO ALL DEVICE TYPES. |
| Protocol_version | 8 | FIXED TO 0 (VERSION NO. OF THE SYSTEM). |
| Command_code | 8 | VALUE INDICATIVE OF THE REGISTER COMMAND. |
| Trigger_validity | 8 | INFORMATION INDICATING PROBABILITY OF TRIGGER INFORMATION BECOMING VALID. |
| App_id | N | APPLICATION ID (ALSO INDICATING URL OF THE APPLICATION PROPER). |
| App_type | 4 | SYSTEM TYPE OF APPLICATION. |
| App_life_span | 1 | SCOPE OF APPLICATION PERFORMANCE. |
| Persistent_priority | 2 | PRIORITY OF ACQUIRING AND RETAINING APPLICATION PROPER. |
| Expire_date | 32 | EXPIRATION DATE. |

FIG. 7

TRIGGER WITH "Execute" COMMAND

| Item | No of Bits | explanation |
|---|---|---|
| Trigger_id | 8 | IDENTIFICATION OF TRIGGER INFORMATION OF THE SAME CONTENT. |
| Target_device_type | 8 | DEVICE TYPE TARGETED BY THE COMMAND. IN THE CASE OF 0xFF, THE COMMAND IS SHOWN TO BE COMMON TO ALL DEVICE TYPES. |
| Protocol_version | 8 | FIXED TO 0 (VERSION NO. OF THE SYSTEM). |
| Command_code | 8 | VALUE INDICATIVE OF THE EXECUTE COMMAND. |
| Trigger_validity | 8 | INFORMATION INDICATING PROBABILITY OF TRIGGER INFORMATION BECOMING VALID. |
| App_id | N | APPLICATION ID (ALSO INDICATING URL OF THE APPLICATION PROPER). |
| App_type | 4 | SYSTEM TYPE OF APPLICATION. |
| TDO_life_scope | 1 | SCOPE OF APPLICATION PERFORMANCE. |
| Expire_date | 32 | EXPIRATION DATE. |

FIG. 8

TRIGGER WITH "Inject_event" COMMAND

| Item | No of Bits | explanation |
|---|---|---|
| Trigger_id | 8 | IDENTIFICATION OF TRIGGER INFORMATION OF THE SAME CONTENT. |
| Target_device_type | 8 | DEVICE TYPE TARGETED BY THE COMMAND. IN THE CASE OF 0xFF, THE COMMAND IS SHOWN TO BE COMMON TO ALL DEVICE TYPES. |
| Protocol_version | 8 | FIXED TO 0 (VERSION NO. OF THE SYSTEM). |
| Command_code | 8 | VALUE INDICATIVE OF THE INJECT EVENT COMMAND. |
| Trigger_validity | 8 | INFORMATION INDICATING PROBABILITY OF TRIGGER INFORMATION BECOMING VALID. |
| App_id | N | APPLICATION ID (ALSO INDICATING URL OF THE APPLICATION PROPER). |
| Event_id | 8 | ID OF EVENT DESCRIBED IN TARGETED APPLICATION. |
| Event Embedded Data | M | DATA HANDED OVER TO APPLICATION UPON FIRING OF EVENT THEREIN. |

FIG. 9

TRIGGER WITH "Suspend" COMMAND

| Item | No of Bits | explanation |
|---|---|---|
| Trigger_id | 8 | IDENTIFICATION OF TRIGGER INFORMATION OF THE SAME CONTENT. |
| Target_device_type | 8 | DEVICE TYPE TARGETED BY THE COMMAND. IN THE CASE OF 0xFF, THE COMMAND IS SHOWN TO BE COMMON TO ALL DEVICE TYPES. |
| Protocol_version | 8 | FIXED TO 0 (VERSION NO. OF THE SYSTEM). |
| Command_code | 8 | VALUE INDICATIVE OF THE SUSPEND COMMAND. |
| Trigger_validity | 8 | INFORMATION INDICATING PROBABILITY OF TRIGGER INFORMATION BECOMING VALID. |
| App_id | N | APPLICATION ID (ALSO INDICATING URL OF THE APPLICATION PROPER). |

FIG. 10

TRIGGER WITH "Terminate" COMMAND

| Item | No of Bits | explanation |
|---|---|---|
| Trigger_id | 8 | IDENTIFICATION OF TRIGGER INFORMATION OF THE SAME CONTENT. |
| Target_device_type | 8 | DEVICE TYPE TARGETED BY THE COMMAND. IN THE CASE OF 0xFF, THE COMMAND IS SHOWN TO BE COMMON TO ALL DEVICE TYPES. |
| Protocol_version | 8 | FIXED TO 0 (VERSION NO. OF THE SYSTEM). |
| Command_code | 8 | VALUE INDICATIVE OF THE TERMINATE COMMAND. |
| Trigger_validity | 8 | INFORMATION INDICATING PROBABILITY OF TRIGGER INFORMATION BECOMING VALID. |
| App_id | N | APPLICATION ID (ALSO INDICATING URL OF THE APPLICATION PROPER). |

FIG.11

| Syntax | No. Bits | Format |
|---|---|---|
| Trigger_Info_data () { | | |
|   trigger_id | 8 | uimsbf |
|   target_device_type | 8 | uimsbf |
|   protocol_version | 8 | uimsbf" |
|   command_code | 8 | uimsbf |
|   trigger_validity | 8 | uimsbf |
|   app_id_length | 8 | bslbsf |
|   for(i=0;i<N;i++) { | | |
|     app_id_byte | 8 | |
|   } | | |
|   if(command_code==1 || command_code==2) { | | (register/execute) |
|     app_type | 4 | uimsbf |
|     app_life_span | 1 | uimsbf |
|     persistent_priority | 2 | Uimsbf |
|     reserved | 1 | |
|     app_expire_date | 32 | uimsbf |
|   } | | |
|   if(command_code==3) { | | (Inject event) |
|     event_id | 16 | uimsbf |
|     event_embedded_data_length | 8 | uimsbf |
|     for(i=0;i<N;i++) { | | |
|       event_embedded_data_byte | 8×N | bslbf |
|     } | | |
|   } | | |
| } | | |

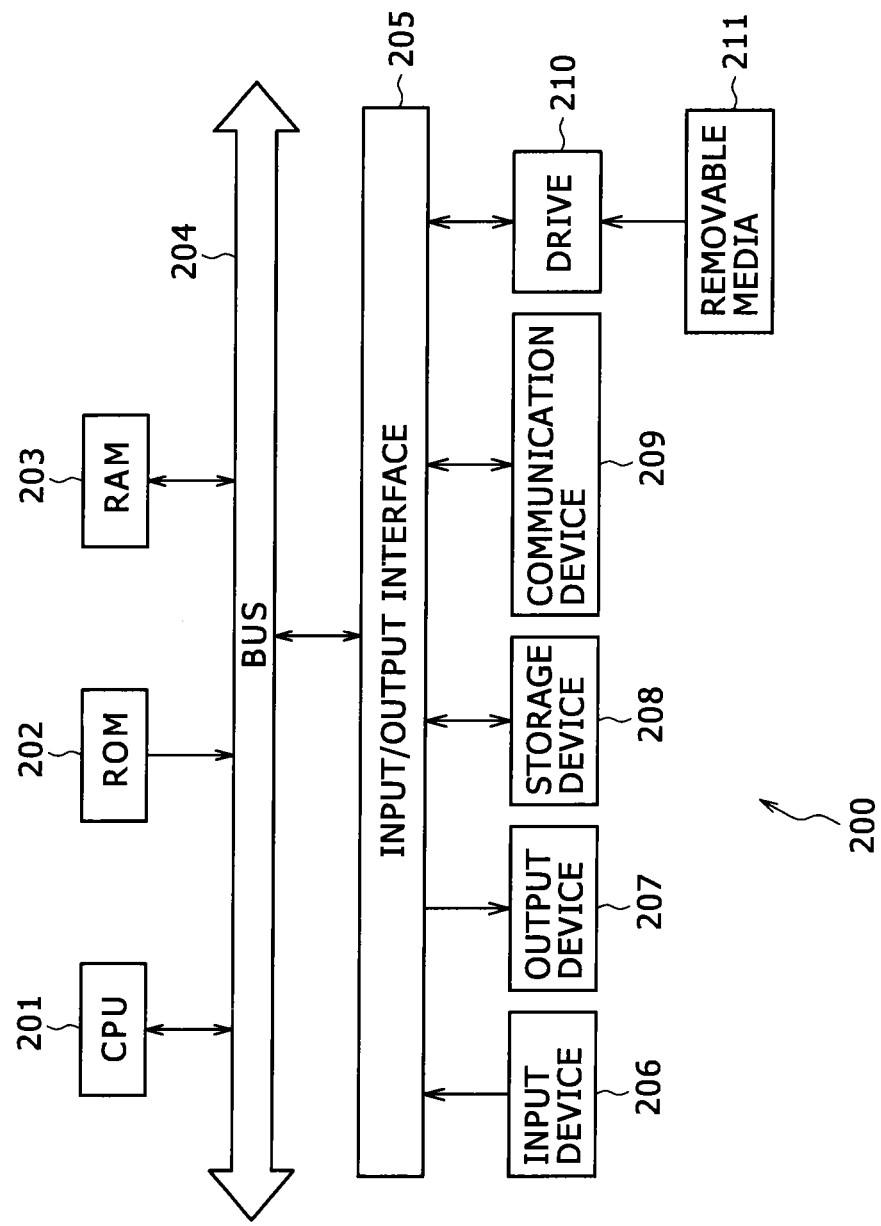

RECEIVING APPARATUS, RECEIVING METHOD, AND PROGRAM

CROSS-REFERENCE TO RELATED APPLICATION

This application claims the benefit of priority of Provisional Application Ser. Nos. 61/388,999, filed Oct. 1, 2010 and 61/497,344, filed Jun. 15, 2011, the entire contents of which is incorporated herein by reference.

BACKGROUND

The present technology relates to a receiving apparatus, a receiving method, and a program. More particularly, the technology relates to a receiving apparatus, a receiving method, and a program for controlling the performance of a predetermined application program in conjunction with the progress of AV content such as a TV program.

In digital TV broadcasting, not only the TV program broadcast service but also the so-called data broadcast service has been put into practice (e.g., see Japanese Patent Laid-Open No. 2006-50237). Studies are now under way to introduce more advanced services in the future into digital TV broadcasting using the Internet.

For example, the advanced services to be introduced into digital TV broadcasting using the Internet may include the service of feeding application programs or the like to receiving apparatus for control thereof or for control of an external device connected thereto in conjunction with the progress of AV content such as a TV program.

SUMMARY

However, there has yet to be established a technology of controlling the performance of an external device connected to the receiving apparatus in conjunction with the progress of a currently received AV content.

The present technology has been made in view of the above circumstances and provides a receiving apparatus, a receiving method, and a program for controlling the performance of an external device connected to the receiving apparatus in conjunction with the progress of AV content.

According to one embodiment of the present technology, there is provided a receiving apparatus including: a reception portion configured to receive AV content being transmitted; a trigger extraction portion configured to extract trigger information for controlling an application program for execution either by the receiving apparatus proper or by an external device connected thereto in conjunction with the AV content, the application program being transmitted along with the AV content; an apparatus proper control portion configured such that if a command indicated by the extracted trigger information is destined for the receiving apparatus proper, the apparatus proper control portion controls performance of the application program in accordance with the command; and an external device processing portion configured such that if the command indicated by the extracted trigger information is destined for the external device, the external device processing portion transfers the command to the external device.

If the application program executed by the external device is the same as the application program currently executed by the receiving apparatus proper, then the apparatus proper control portion may terminate the application program currently executed by the receiving apparatus proper.

If the application program executed by the external device is different from the application program currently executed by the receiving apparatus proper, then the apparatus proper control portion may allow the receiving apparatus proper to continue executing the currently executing application program.

The apparatus proper control portion may exercise control so that the receiving apparatus proper does not execute the same program as the application program currently executed by the external device.

The command indicated by the trigger information may include information for designating a specific device or part of or all of the devices that may be targeted by the command.

The trigger information may include one of the commands to acquire, register, start, fire an event in, suspend, and terminate a predetermined application program.

In accordance with each of the commands, the apparatus proper control portion may exercise control so as to acquire, register, or start the application program; or to fire an event in, suspend, or terminate the currently executing application program.

The external device processing portion may transfer to the external device the command to acquire, register, or start the application program; or to fire an event in, suspend, or terminate the currently executing application program.

The receiving apparatus may be either an independent apparatus or an internal block or blocks constituting a single apparatus.

According to other embodiments of the present technology, there are provided a receiving method and a program functionally corresponding to the above-outlined receiving apparatus.

Through the use of the receiving apparatus, receiving method, or program embodying the present technology as outlined above, transmitted AV content is first received. Then trigger information is extracted for controlling an application program for execution either by the receiving apparatus or by an external device connected thereto in conjunction with the AV content, the application program being transmitted along with the AV content. If a command indicated by the extracted trigger information is destined for the receiving apparatus proper, performance of the application program is controlled in accordance with the command. If the command indicated by the extracted trigger information is destined for the external device, the command is transferred to the external device.

According to the present technology embodied as outlined above, it is possible to operate the external device connected to the receiving apparatus in conjunction with the progress of AV content.

BRIEF DESCRIPTION OF THE DRAWINGS

FIG. 6 is a tabular view listing the items included in the trigger information as a register command;

FIG. 7 is a tabular view listing the items included in the trigger information as an execute command;

FIG. 8 is a tabular view listing the items included in the trigger information as an inject event command;

FIG. 9 is a tabular view listing the items included in the trigger information as a suspend command;

FIG. 10 is a tabular view listing the items included in the trigger information as a terminate command;

FIG. 11 is a schematic view showing a typical syntax of the trigger information;

FIG. 21 is a schematic view showing a typical structure of a computer.

DETAILED DESCRIPTION OF THE PREFERRED EMBODIMENTS

Some preferred embodiments of the present technology will now be described below in reference to the accompanying drawings.

[Configuration Example of the Broadcasting System]

Figure 1:
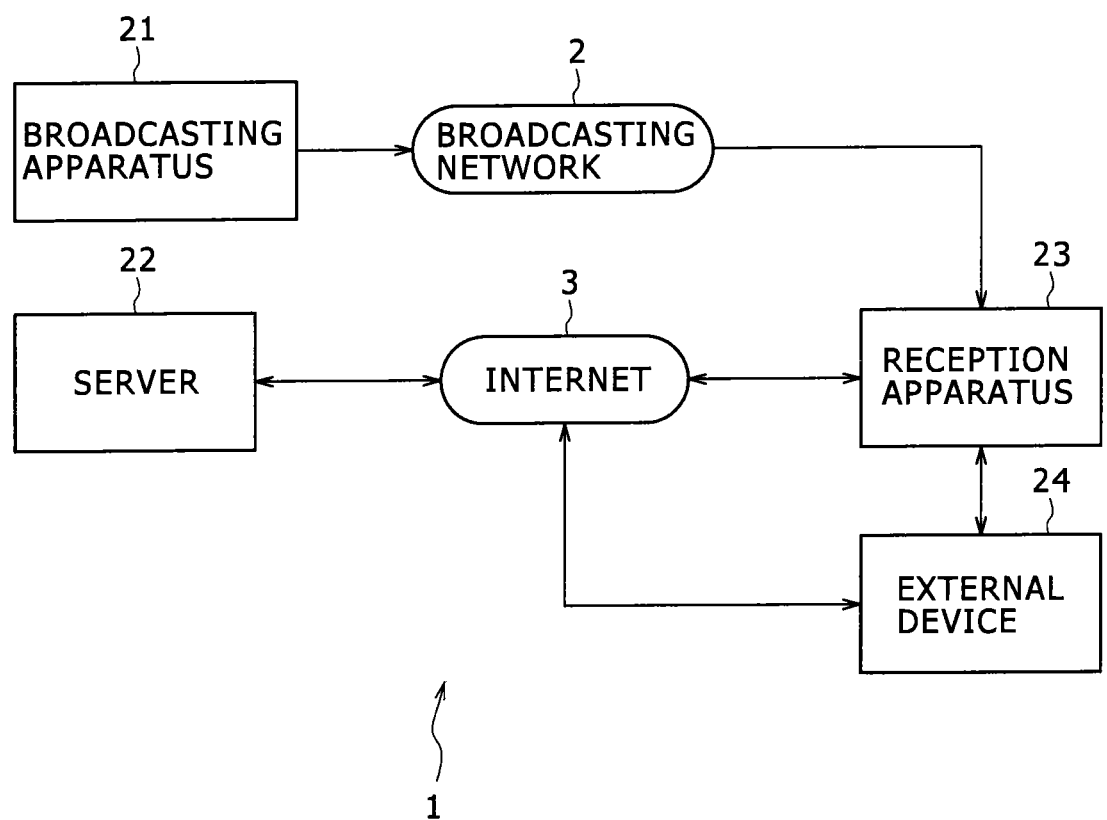
FIG. 1 is a schematic view showing a typical configuration of a broadcasting system.

FIG. 1 is a schematic view showing a typical configuration of a broadcasting system.

The broadcasting system 1 is made up of a broadcasting apparatus 21 and a server 22 on the broadcasting side and a receiving apparatus 23 and an external device 24 on the receiving side.

The broadcasting apparatus 21 is designed to transmit a digital TV broadcast signal via a broadcasting network 2 such as a terrestrial digital broadcasting network. The digital TV broadcast signal is used to transmit AV content such as TV programs, CMs, etc.

Also, the broadcasting apparatus 21 transmits, as part of the digital TV broadcast signal, trigger information constituting a command for executing a data broadcast application program (called the data broadcast application or applications hereunder) in conjunction with AV content. Specifically, the trigger information is transmitted in a manner placed in transport streams (call the TS hereunder) for transporting the digital TV broadcast signal or embedded in video and audio signals.

In addition to information showing the command type, the trigger information includes information indicating where the data broadcast application is acquired from. The trigger information will be discussed later in detail.

The server 22 feeds data broadcast applications to the receiving apparatus 23 or to the external device 24 in response to their request following their access to the server 22.

The receiving apparatus 23 receives the digital broadcast signal from the receiving apparatus 21 and outputs the video and audio of AV content to a monitor (not shown). The receiving apparatus 23 also gains access to the server 22 via the Internet 3, acquires data broadcast applications from the server 22, and executes the acquired applications.

Furthermore, the receiving apparatus 23 is connected with the external device 24 and controls performance of the data broadcast application executed by the external device 24.

Incidentally, the receiving apparatus 23 may be provided as an independent apparatus or incorporated in TV set or in a video recorder, for example.

The external device 24 is connected to the receiving apparatus 23 and, under control of the receiving apparatus 23, gains access to the server 22, acquires a data broadcast application from the server 22, and executes the acquired application.

Examples of the external device 24 include a smart phone, a personal digital assistant, a digital TV set, and a video recorder.

The broadcasting system 1 is structured as explained above.

[Typical Structure of the Broadcasting Apparatus]

Figure 2:
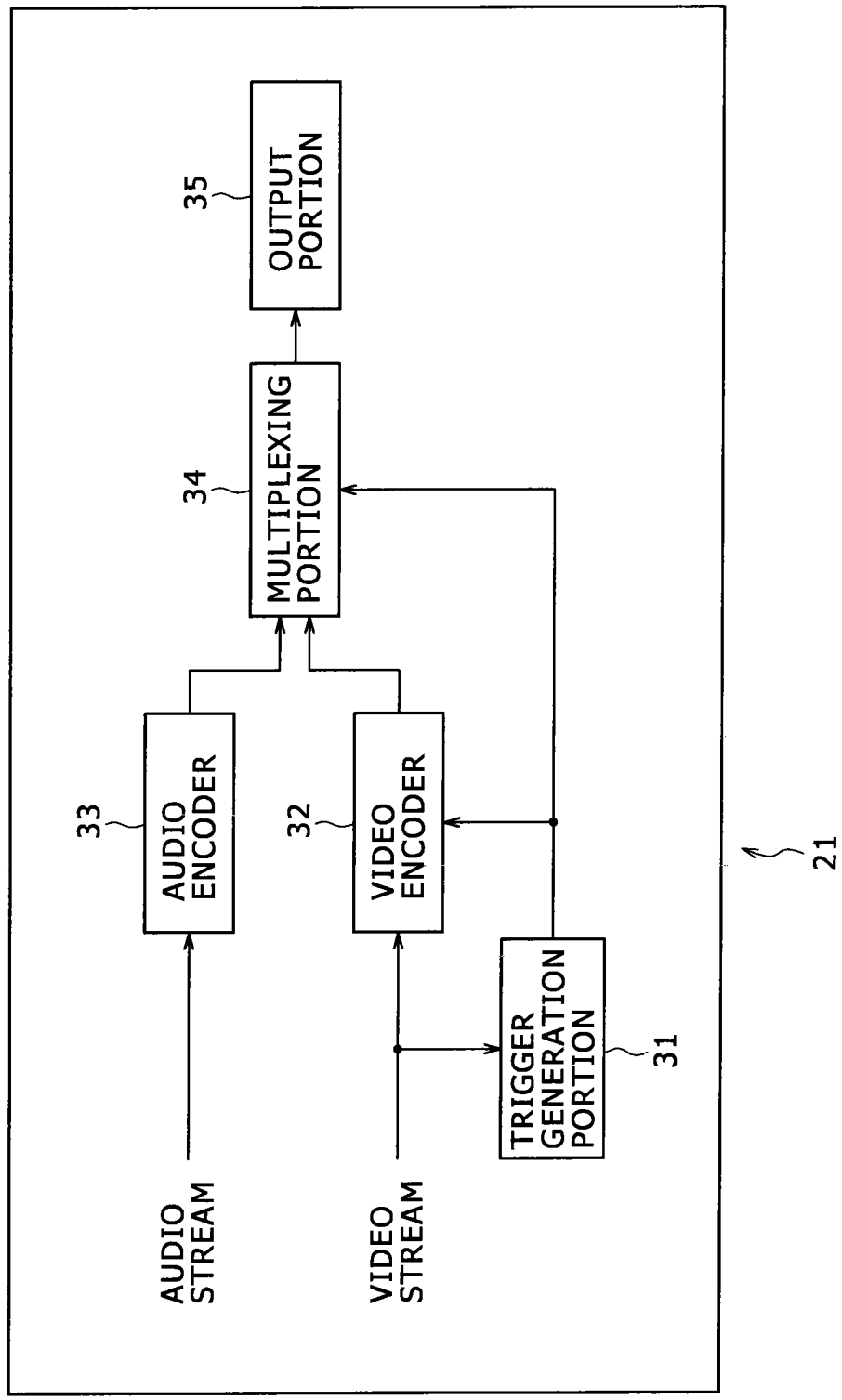
FIG. 2 is a schematic view showing a typical structure of a broadcasting apparatus.

FIG. 2 is a schematic view showing a typical structure of a broadcasting apparatus.

The broadcasting apparatus 21 is made up of a trigger generation portion 31, a video encoder 32, an audio encoder 33, a multiplexing portion 34, and an output portion 35.

The trigger generation portion 31 generates trigger information in keeping with the progress of a video stream such as a TV program and CMs being input from an upstream stage, and outputs the generated trigger information to the video encoder 32 and multiplexing portion 34.

The video encoder 32 encodes an AV content video stream such as a TV program input from the upstream stage in accordance with a predetermined coding system, and supplies the encoded video stream thus obtained to the multiplexing portion 34. Incidentally, typical coding systems for use by the video encoder 32 include MPEG-2 (Moving Picture Experts Group phase 2) and H.264.

Also, when encoding the video stream, the video encoder 32 embeds trigger information sent from the trigger generation portion 31 into the video stream and outputs the encoded video stream thus obtained to the multiplexing portion 34.

The audio encoder 33 encodes the audio stream corresponding to the video stream input to the video encoder 32 in accordance with a predetermined coding system, and supplies the encoded audio stream thus obtained to the multiplexing portion 34. Typical coding systems for use by the audio encoder 33 include AC3 (Audio Code number 3) and AAC (Advanced Audio Coding).

The multiplexing portion 34 is supplied with the encoded video stream from the video encoder 32, encoded audio stream from the audio encoder 33, and trigger information from the trigger generation portion 31.

The multiplexing portion 34 multiplexes the encoded video stream and encoded audio stream together with the trigger information, and supplies the multiplexed stream thus obtained to the output portion 35. Specifically, the streams may be multiplexed into TS for example. Alternatively, in consideration of digital TV broadcasts distributed over networks, the streams may be multiplexed into an ISO-based media file format (MP4).

The output portion 35 outputs the multiplexed stream fed from the multiplexing portion 34 as a digital TV broadcast signal.

The broadcasting apparatus 21 is structured as explained above.

In the foregoing explanation, the trigger information was shown to be embedded into the video stream and also multiplexed into the multiplexed stream. Alternatively, the trigger information may be either embedded in the video stream or multiplexed into the multiplexed stream. As another alternative, the trigger information may be embedded in the audio stream or processed otherwise so as to be transmitted.

[Typical Structure of the Receiving Apparatus]

Figure 3:
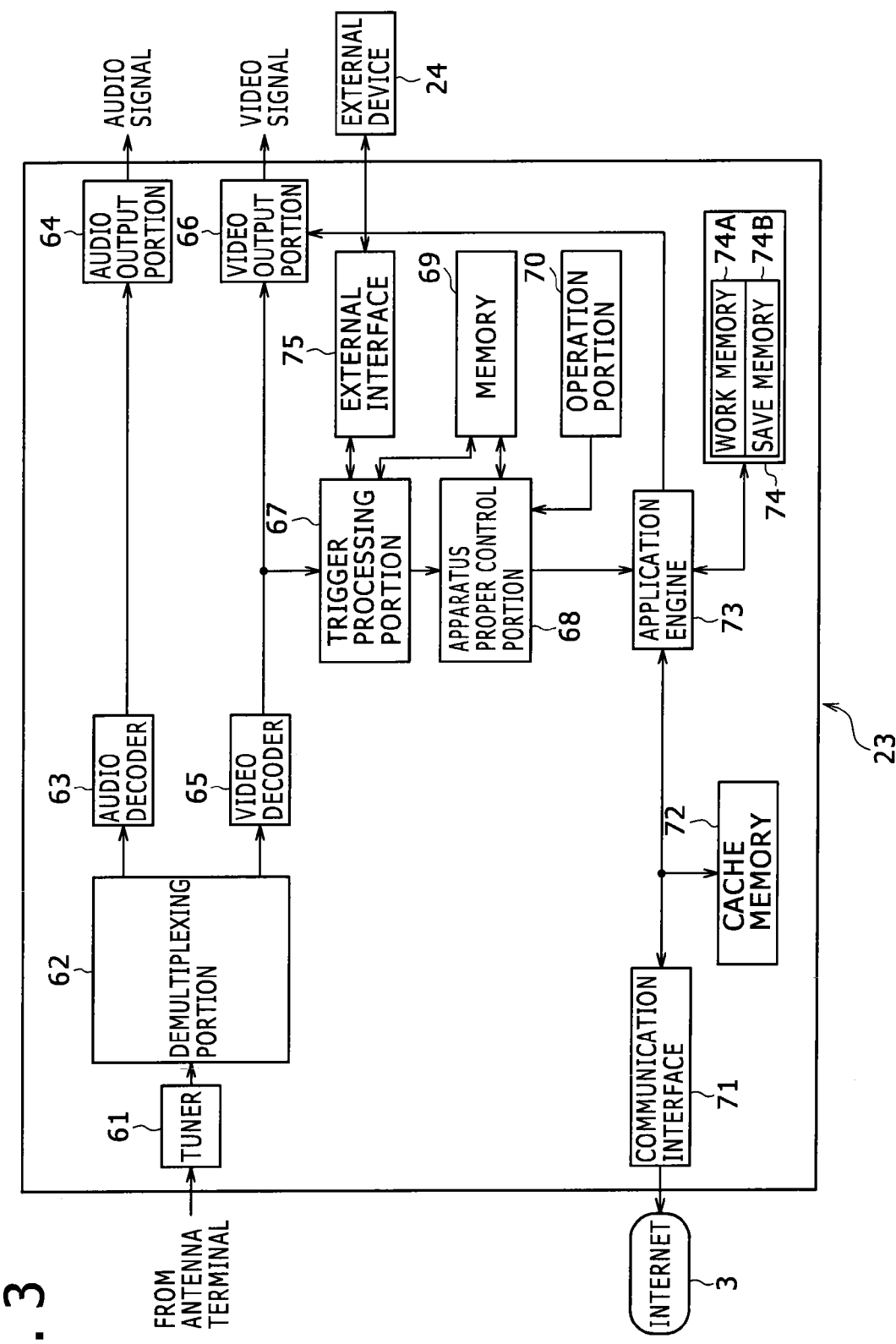
FIG. 3 is a schematic view showing a typical structure of a receiving apparatus.

FIG. 3 is a schematic view showing a typical structure of a receiving apparatus.

The receiving apparatus 23 is made up of a tuner 61, a demultiplexer portion 62, an audio decoder 63, an audio output portion 64, a video decoder 65, a video output portion 66, a trigger processing portion 67, an apparatus proper control portion 68, a memory 69, an operation portion 70, a communication interface 71, a cache memory 72, an application engine 73, an application memory 74, and an external interface 75.

The tuner 61 receives and demodulates a digital TV broadcast signal corresponding to the service selected by a user (i.e., channel), and supplies the multiplexed stream obtained through demodulation to the demultiplexing portion 62.

The demultiplexing portion 62 demultiplexes encoded audio and video signals from the multiplexed stream fed from the tuner 61, and supplies the encoded audio signal and encoded video signal to the audio decoder 63 and video decoder 65, respectively.

The audio decoder 63 demodulates the encoded audio signal fed from the demultiplexing portion 62, and supplies the audio signal obtained through demodulation to the audio output portion 64.

The audio output portion 64 outputs the audio signal fed from the audio decoder 63 to a downstream stage such as speakers.

The video decoder 65 demodulates the encoded video signal fed from the demultiplexing portion 62, and supplies the video signal obtained through demodulation to the audio output portion 66 and trigger processing portion 67.

The audio output portion 66 outputs the video signal fed from the video decoder 65 to a downstream stage such as a display device. Also, the video output portion 66 combines the video signal fed from the video decoder 65 with a data broadcast application video signal supplied from the application engine 73, and outputs the composite signal to the downstream stage.

The trigger processing portion 67 continuously monitors the video signal fed from the video decoder 65, and extracts trigger information embedded in the video signal. The trigger processing portion 67 analyzes the extracted trigger information, and sends the result of the analysis to the apparatus proper control portion 68.

Based on the result of the analysis of the trigger information, the trigger processing portion 67 also supplies the external interface 75 with a command included in the trigger information and destined for an external device (i.e., external device 24), in order to control performance of the data broadcast application executed by the external device 24. Furthermore, the trigger processing portion 67 records various kinds of information to the memory 69 or acquires information stored in the memory 69 as needed.

The trigger processing portion 67 will be discussed later in more detail.

The apparatus proper control portion 68 controls the components of the receiving apparatus 23 in operation by carrying out control programs held in the memory 69. The apparatus proper control portion 68 is also supplied with the result of the analysis of trigger information from the trigger processing portion 67. In response to the command included in the trigger information and destined for the receiving apparatus proper (i.e., receiving apparatus 23), the apparatus proper control portion 68 controls acquisition, registration, or start of a data broadcast application; or firing of an event in, suspension of, or termination of an executing data broadcast application.

The memory 69 records control programs and various kinds of information. The operation portion 70 accepts various operations performed by the user, and supplies the apparatus proper control portion 68 with operation signals corresponding to these operations.

Under control of the application engine 73, the communication interface 71 connects to the server 22 via the Internet 3. Under control of the apparatus proper control portion 68, the application engine 73 acquires a data broadcast application from the server 22 via the communication interface 71 and over the Internet 3, and retains the acquired application in the cache memory 72.

Under control of the apparatus proper control portion 68, the application engine 73 reads the data broadcast application held in the cache memory 72 and executes the retrieved application. The video signal stemming from the currently executing data broadcast application is fed to the video output portion 66.

The application memory 74 is made up of a work memory 74A and a save memory 74B. The application engine 73 records to the work memory 74A the data about the currently executing data broadcast application (specifically, data including layers of displayed information). Also, when suspending the currently executing data broadcast application, the application engine 73 moves the data held in the work memory 74A of the application memory 74 into the save memory 74B. And when resuming the suspended data broadcast application, the application engine 73 moves the data held in the save memory 74B into the work memory 74A so as to restore the state in effect before the suspension.

The external interface 75 establishes wireless or wired connection with the external device 24, and sends to the external device 24 the command fed from the trigger processing portion 67 and destined for the external device. Also, the external interface 75 receives notification sent from the external device 24 to the receiving apparatus 23, and forwards the received notification to the trigger processing portion 67.

The receiving apparatus 23 is structured as explained above.

[Typical Detailed Structure of the Trigger Processing Portion]

Figure 4:
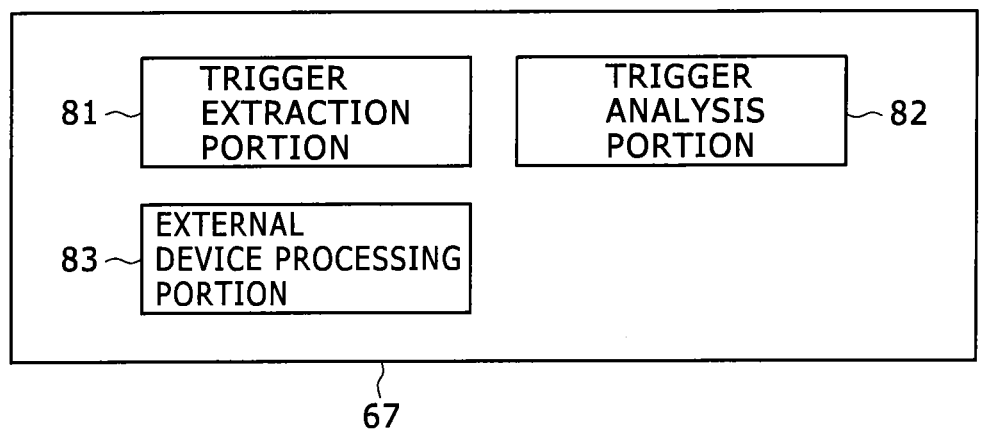
FIG. 4 is a schematic view showing a typical structure of a trigger processing portion.

FIG. 4 is a schematic view showing a typical detailed structure of the trigger processing portion included in FIG. 3.

The trigger processing portion 67 is made up of a trigger extraction portion 81, a trigger analysis portion 82, and an external device processing portion 83.

The trigger extraction portion 81 continuously monitors the video signal fed from the video decoder 65, extracts trigger information embedded in the video signal, and feeds the extracted information to the trigger analysis portion 82.

The trigger analysis portion 82 analyzes the trigger information fed from the trigger extraction portion 81, and supplies the apparatus proper control portion 68 with the command included in the trigger information and destined for the receiving apparatus proper. Also, the trigger analysis portion 82 feeds the external device processing portion 83 with the command included in the trigger information and destined for the external device.

The external device processing portion 83 sends to the external interface 75 the command fed from the trigger analysis portion 82 and destined for the external device, in order to transfer the command to the external device 24. Also, the external device processing portion 83 performs various processes on the external device 24.

The trigger processing portion 67 is structured as explained above.

[Typical Structure of the External Device]

Figure 5:
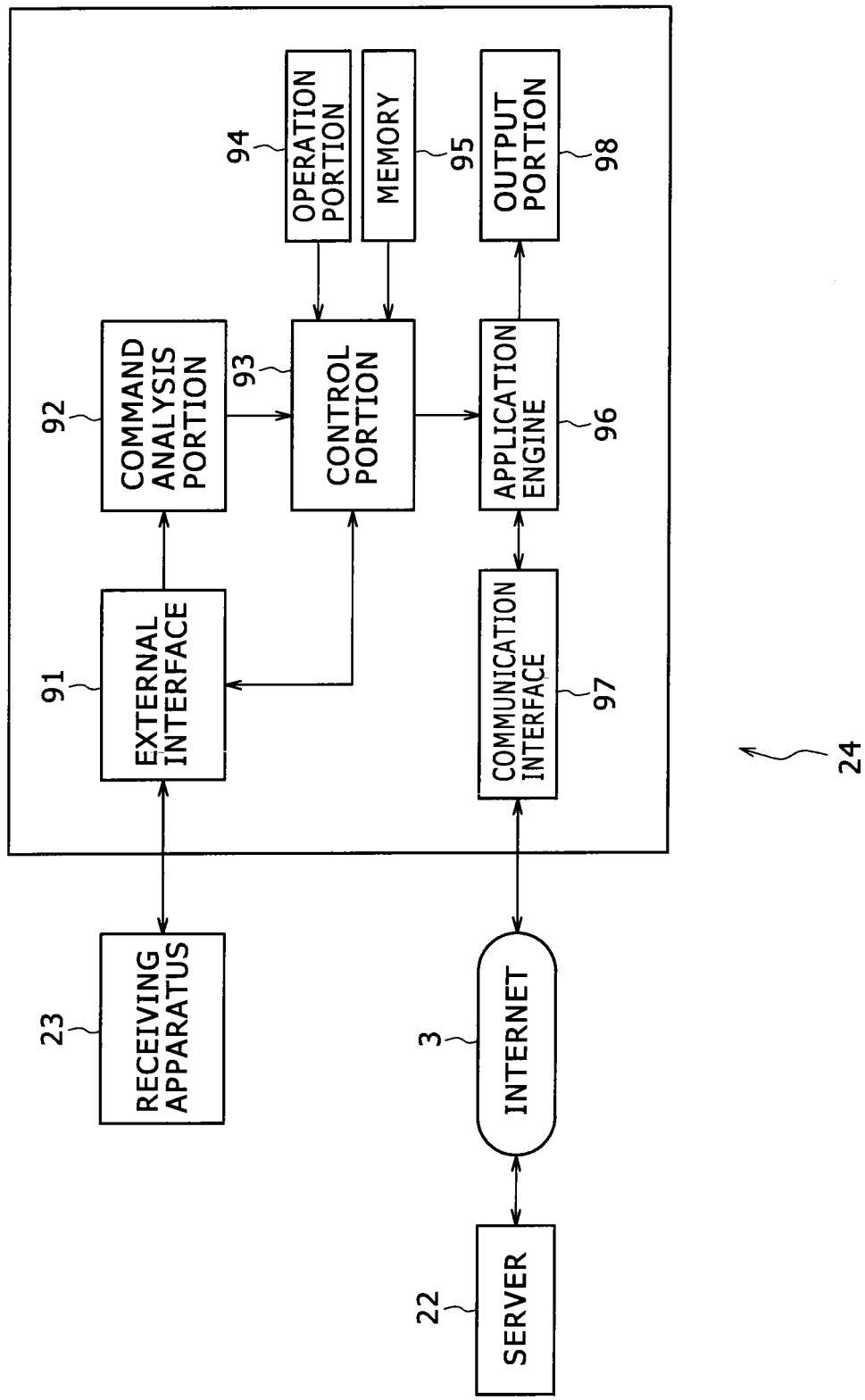
FIG. 5 is a schematic view showing a typical structure of an external device.

FIG. 5 is a schematic view showing a typical structure of an external device.

The external device 24 is made up of an external interface 91, a command analysis portion 92, a control portion 93, an operation portion 94, a memory 95, an application engine 96, a communication interface 97, and an output portion 98.

The external interface 91 establishes wireless or wired connection with the receiving apparatus 23, and receives the command sent from the receiving apparatus 23 and destined for the external device. The external interface 91 feeds the received command to the command analysis portion 92.

The command analysis portion 92 analyzes the command fed from the external interface 91 and destined for the external device, and supplies the result of the analysis to the control portion 93.

The control portion 93 controls the components of the external device 24 in operation by carrying out control programs held in the memory 95. Also, in response to the command fed from the command analysis portion 92 and destined for the external device, the control portion 93 controls acquisition, registration, or start of a data broadcast application; or firing of an event in, suspension of, or termination of an executing data broadcast application.

The operation portion 94 accepts various operations performed by the user, and supplies the control portion 93 with operation signals corresponding to these operations.

Under control of the control portion 93, the application engine 96 acquires a data broadcast application from the server 22 via the communication interface 97 and over the Internet 3, and executes the acquired application. The application engine 96 supplies the output portion 98 with the video and audio signals of the data broadcast application which result from the currently executing application and which are related to the AV content being received by the receiving apparatus 23.

Under control of the application engine 96, the communication interface 97 connects to the server 22 via the Internet 3 and acquires the data broadcast application from the server 22.

The output portion 98 displays images corresponding to the video signal fed from the application engine 96, and outputs sounds corresponding to the audio signal from the application engine 96.

The external device 24 is structured as explained above.

[Details of Trigger Information]

Trigger information will now be discussed in detail.

The trigger information is information for controlling data broadcast applications. The trigger information may include a register command, an execute command, an inject event command, a suspend command, and a terminate command, for example.

FIG. 6 is a tabular view listing the items included in the trigger information as the register command. The register command is a command that instructs the receiving apparatus 23 to acquire and register a data broadcast application.

"Trigger_id" is information for identifying this trigger information. If the trigger information of the same content is transmitted a number of times, each trigger information has the same "Trigger_id."

"Target_device_type" is information for indicating the device type targeted by the command. If "0xFF" is designated, then the command is common to all device types. For example, in "Target_device_type," a specific device such as the receiving apparatus proper or the external device, or some or all devices may be designated as the target device or devices (i.e., destinations) for the command.

"Protocol_version" indicates the protocol version of this trigger information. "Command_code" indicates the command type of this trigger information. In the case of FIG. 6, the information indicating the register command is described.

"Trigger_validity" is a server access dispersion parameter indicating the probability that each receiving apparatus 23 having received this trigger information will perform its processing in accordance with the trigger information.

"App_id" is identification information about the data broadcast application acquired corresponding to this trigger information. Also, "App_id" indicates the URL of the location (server 22 in this case) from which the data broadcast application is acquired corresponding to this trigger information.

"App_type" is information indicating the data broadcast application type (e.g., HTML5, java) corresponding to this trigger information. "App_life_span" is information indicating the scope of the performance of the data broadcast application.

"Persistent_priority" indicates the priority in effect when the corresponding data broadcast application is acquired and retained. "Expire_date" is information indicating the expiration date of the data broadcast application. When the data broadcast application is registered, the priority ("Persistent_priority") and expiration date ("Expire_date") thereof are stored. The data broadcast application is managed in accordance with the priority and expiration date thus stored.

FIG. 7 is a tabular view listing the items included in the trigger information as the execute command. The execute command is a command that instructs the receiving apparatus 23 to execute the data broadcast application.

"Trigger_id," "Target_device_type," "Protocol_version," "Command_code," "Trigger_validity," "App_id," "App_type," and "Expire_date" are the same as the corresponding items included in the trigger information shown in FIG. 6 as the register command. It should be noted that "Command_code" describes information indicating the execute command. "TDO_life_scope" is information indicating the scope of the performance of the data broadcast application.

FIG. 8 is a tabular view listing the items included in the trigger information as the inject event ("Inject_event") command. The inject event command is a command that fires an event into the currently executing data broadcast application.

"Trigger_id," "Target_device_type," "Protocol_version," "Command_code," "Trigger_validity," "App_id," and "App_type" are the same as the corresponding items included in the trigger information shown in FIG. 6 as the register command. It should be noted that "Command_code" describes information indicating the inject event command.

"Event_id" is identification information about the event to be fired into the data broadcast application designated by "App_id." "Event Embedded Data" describes the data to be referenced when the event is fired.

FIG. 9 is a tabular view listing the items included in the trigger information as the suspend command. The suspend command is a command that instructs the receiving apparatus 23 to suspend the currently executing data broadcast application.

"Trigger_id," "Target_device_type," "Protocol_version," "Command_code," "Trigger_validity," and "App_id" are the same as the corresponding items included in the trigger information shown in FIG. 6 as the register command. It should be noted that "Command_code" describes information indicating the suspend command.

FIG. 10 is a tabular view listing the items included in the trigger information as the terminate command. The terminate command is a command that instructs the receiving apparatus 23 to terminate the currently executing data broadcast application.

"Trigger_id," "Target_device_type," "Protocol_version," "Command_code," "Trigger_validity," and "App_id" are the same as the corresponding items included in the trigger information shown in FIG. 6 as the register command. It should be noted that "Command_code" describes information indicating the terminate command.

FIG. 11 is a schematic view showing a typical trigger information syntax applicable to the trigger information constituting each of the commands explained above. Any other suitable trigger information syntax may be adopted, and the example in FIG. 11 is not limitative of the present technology.

[State Transitions of the Data Broadcast Application]

Figure 12:
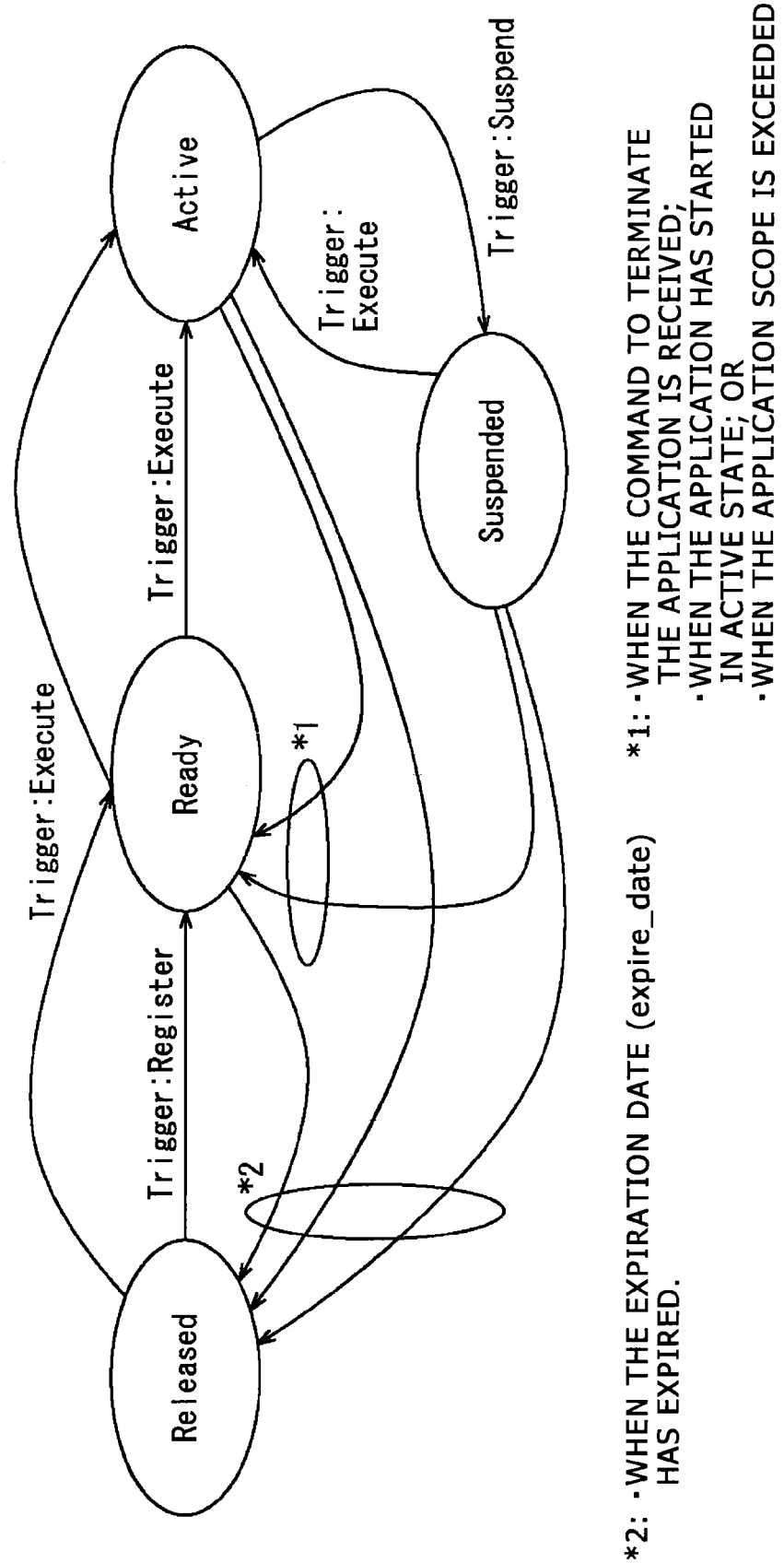
FIG. 12 is a state transition diagram of a data broadcast application program.

FIG. 12 is a state transition diagram of a data broadcast application operating in keeping with the trigger information constituting the register command, execute command, inject event command, suspend command, and terminate command.

As shown in FIG. 12, the data broadcast application may be defined as being in one of four states: released state, ready state, active state, and suspended state.

The released state refers to a state in which the data broadcast application has yet to be acquired by the receiving apparatus 23. The ready state refers to a state in which the data broadcast application in question has been registered by the receiving apparatus 23 but has yet to be executed thereby. The active state refers to a state in which the data broadcast application has been started and is currently executing. The suspended state is a state in which execution of the data broadcast application is suspended and information indicating the status in effect upon suspension is retained in the save memory 74B.

Figure 13:
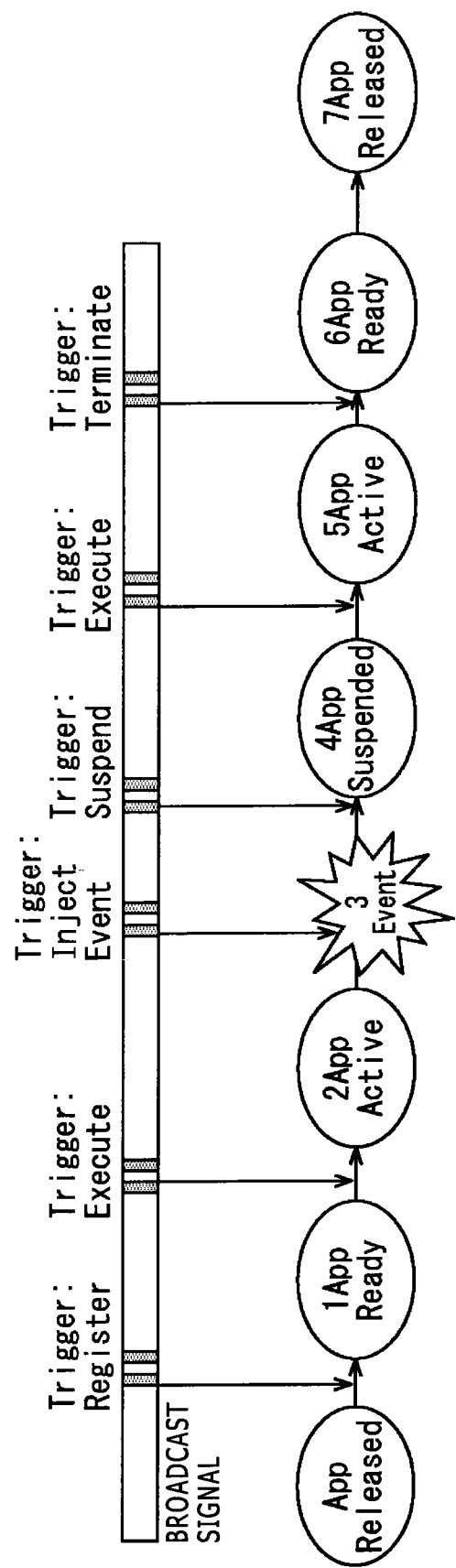
FIG. 13 is a schematic view showing relations between each of the commands on the one hand and the state transitions of the data broadcast application program on the other hand.

FIG. 13 is a schematic view showing relations between each of the commands on the one hand and the state transitions of the data broadcast application on the other hand.

When the data broadcast application is in the released state (i.e., when the application has yet to be acquired by the receiving apparatus 23), the application may be acquired and retained in response to the trigger information constituting the register command. When the data broadcast application has been acquired, retained and registered, the application makes transition to the ready state.

When the data broadcast application is in the ready state, the application may be executed in response to the trigger information constituting the execute command. Once executed, the data broadcast application makes transition to the active state.

When the data broadcast application is in the released state (i.e., when the application has yet to be acquired by the receiving apparatus 23), the application may be acquired, registered and executed in response to the trigger information constituting the execute command. Once executed, the data broadcast application makes transition to the active state. Also, when the data broadcast application is in the active state, the currently executing application may perform diverse processes in response to the trigger information constituting the inject event command, the processes including firing an event and reading updated data to be reflected on the display.

When the data broadcast application is in the active state, the currently executing application may be suspended to make transition to the suspended state in response to the trigger information constituting the suspend command. When the data broadcast application is in the suspended state, the application may make transition to the ready state in response to the trigger information constituting the terminate command.

When the data broadcast application is in the suspended state, the suspended application may be resumed to make transition to the active state in response to the trigger information constituting the execute command. Also, when the data broadcast application is in the active state, the currently executing application may be terminated to make transition to the ready state in response to the trigger information constituting the terminate command.

When the data broadcast application is in the ready state, active state or suspended state, the expiration date of the application in question may expire. In that case, the data broadcast application is deleted from the cache memory 72, has its registration cancelled, and makes transition to the released state.

[Operating Scenarios]

Figure 14:
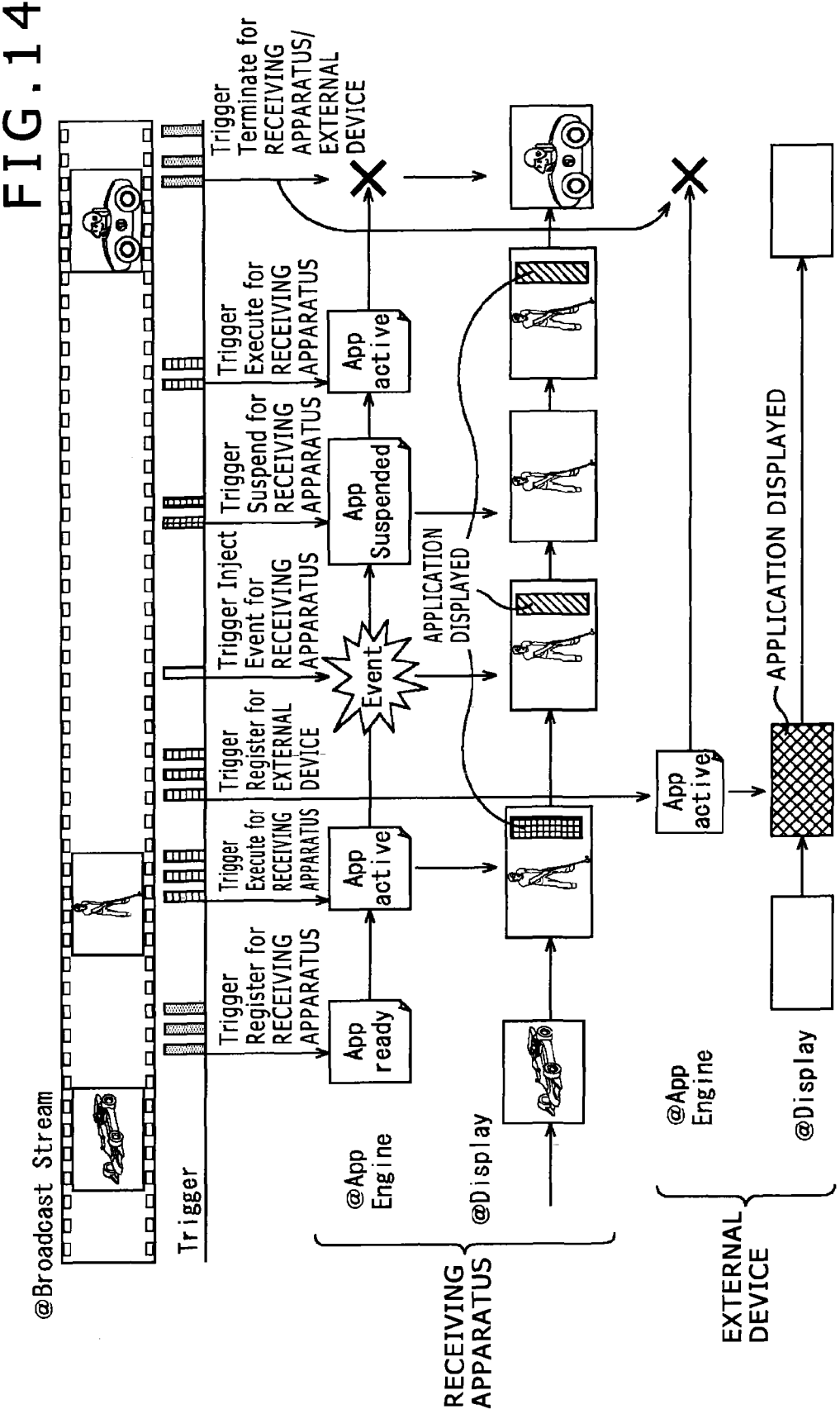
FIG. 14 is a schematic view showing an operating scenario in effect when different data broadcast application programs are acquired.
Figure 15:
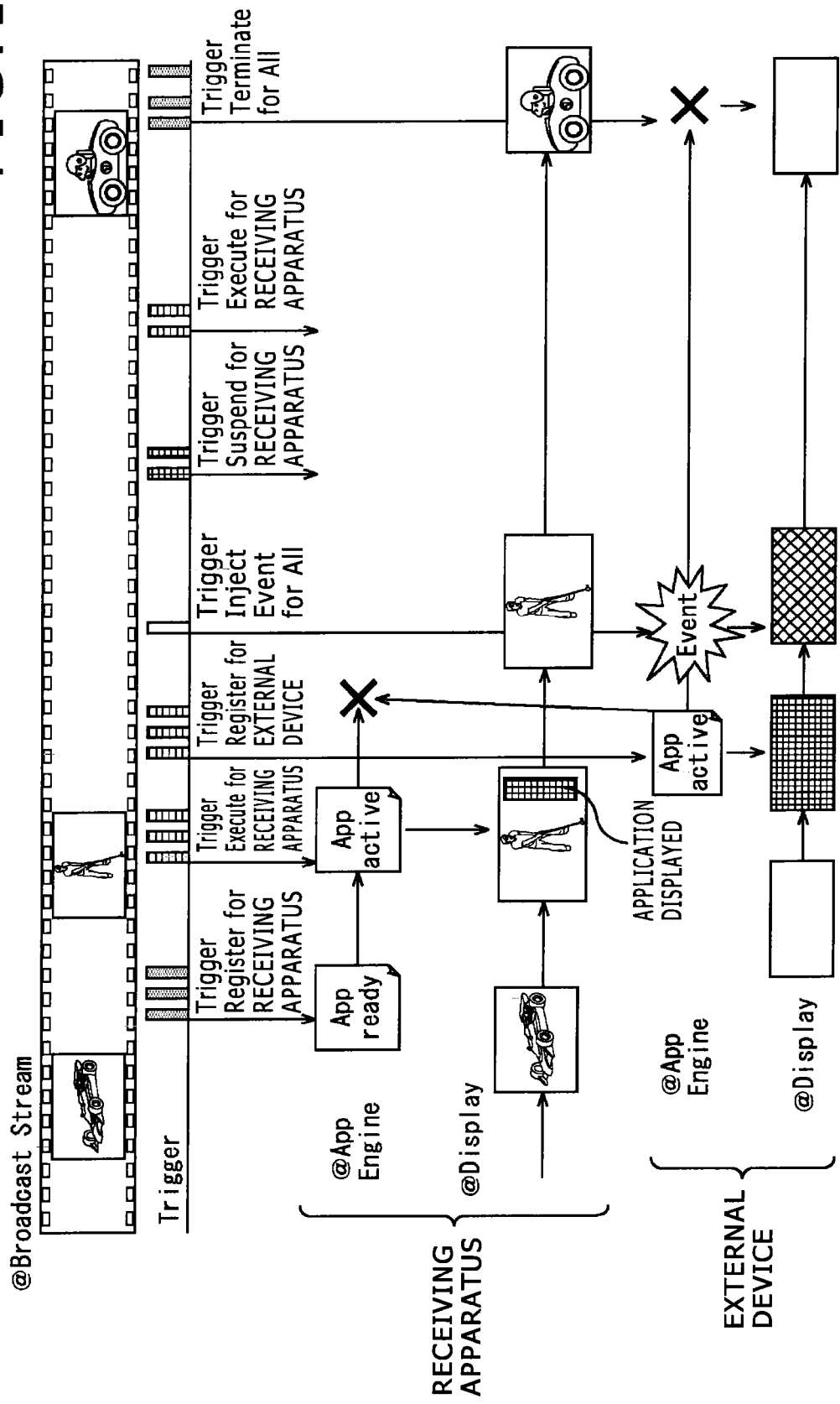
FIG. 15 is a schematic view showing an operating scenario in effect when the same data broadcast application program is acquired.

Using the above-described trigger information makes it possible to operate the data broadcast application as shown in FIGS. 14 and 15 for example.

FIG. 14 is a schematic view showing an operating scenario in effect when different data broadcast application programs are acquired by different apparatuses.

In keeping with the progress of a TV program (i.e., AV content), the broadcasting apparatus 21 may transmit to the receiving apparatus proper the trigger information constituting the register command for acquiring and registering the data broadcast application corresponding to the TV program in question. Upon receipt of the trigger information, the receiving apparatus 23 acquires and registers the corresponding data broadcast application.

In keeping with the progress of the TV program, the broadcasting apparatus 21 may then transmit to the receiving apparatus proper the trigger information constituting the execute command for executing the data broadcast application corresponding to the TV program. Upon receipt of the trigger information, the receiving apparatus 23 executes the corresponding data broadcast application. When executed, the data broadcast application is displayed in overlapping fashion over the images of the TV program.

In keeping with the progress of the TV program, the broadcasting apparatus 21 may then transmit to the receiving apparatus proper the trigger information constituting another execute command for executing a data broadcast application different from the data broadcast application currently executed by the receiving apparatus 23. Upon receipt of the trigger information, the receiving apparatus 23 transfers the execute command to the external device 24.

On receiving the execute command transferred from the receiving apparatus 23, the external device 24 acquires and executes accordingly another data broadcast application different from the currently executing data broadcast application on the receiving apparatus 23.

Then in keeping with the progress of the TV program, the broadcasting apparatus 21 may transmit the trigger information constituting the inject event command to the receiving apparatus proper. Upon receipt of the trigger information, the receiving apparatus 23 performs predetermined processes such as injecting an event in the currently executing data broadcast application and reading updated data to be reflected on the display.

In a suitably timed manner, the broadcasting apparatus 21 may transmit to the receiving apparatus proper the trigger information constituting the suspend command for suspending the data broadcast application. Upon receipt of the trigger information, the receiving apparatus 23 suspends accordingly the currently executing data broadcast application. Thereafter, the broadcasting apparatus 21 may transmit to the receiving apparatus proper the trigger information constituting the execute command for executing the data broadcast application. On receiving the trigger information, the receiving apparatus 23 resumes the suspended data broadcast application.

Then in keeping with the end of the TV program, the broadcasting apparatus 21 transmits to both the receiving apparatus proper and the external device the trigger information constituting the terminate command for terminating the currently executing data broadcast application. On receiving the trigger information, the receiving apparatus 23 terminates the currently executing data broadcast application. The receiving apparatus 23 further transfers the terminate command to the external device 24.

Upon receipt of the terminate command transferred from the receiving apparatus 23, the external device 24 terminates accordingly the currently executing data broadcast application.

Where different data broadcast applications are to be acquired by different apparatuses, the data broadcast applications are executed independently by the receiving apparatus 23 and by the external device 24.

FIG. 15 is a schematic view showing an operating scenario in effect when the same data broadcast application program is acquired by different apparatuses.

As in the case of FIG. 14, the receiving apparatus 23 may transmit to the receiving apparatus proper the trigger information constituting the register command and the execute command. The trigger information causes the receiving apparatus 23 to acquire and register the data broadcast application before executing the application.

Then in keeping with the progress of the TV program, the broadcasting apparatus 21 may transmit toward the external device the trigger information constituting the execute command for executing the same data broadcast application as the application currently executed by the receiving apparatus 23. Upon receipt of the trigger information, the receiving apparatus 23 transfers the execute command to the external device 24.

Upon receipt of the execute command transferred from the receiving apparatus 23, the external device 24 acquires and executes the same data broadcast application as the application currently executed by the receiving apparatus 23. When the external device 24 executes the data broadcast application, the receiving apparatus 23 terminates the currently executing data broadcast application.

Then in keeping with the progress of the TV program, the broadcasting apparatus 21 may transmit the trigger information constituting the inject event command to all apparatuses. Upon receipt of the trigger information, the receiving apparatus 23 ignores the inject event command because the data broadcast application has been terminated. Also, the receiving apparatus 23 transfers the inject event command to the external device 24.

On receiving the inject event command transferred from the receiving apparatus 23, the external device 24 performs predetermined processes such as firing an event in the currently executing data broadcast application and reading updated data to be reflected on the display.

In a suitably timed manner, the broadcasting apparatus 21 may then transmit to the receiving apparatus proper the trigger information constituting the suspend command or the execute command for suspending or executing the data broadcast application. Upon receipt of the trigger information, the receiving apparatus 23 ignores these commands because the data broadcast application has been terminated.

Then in keeping with the end of the TV program, the broadcasting apparatus 21 transmits to all apparatuses the trigger information constituting the terminate command for terminating the currently executing data broadcast application. Upon receipt of the trigger information, the receiving apparatus 23 ignores the command because the data broadcast application has been terminated. Also, the receiving apparatus 23 transfers the terminate command to the external device 24.

On receiving the terminate command transferred from the receiving apparatus 23, the external device 24 terminates the currently executing data broadcast application.

Where the same data broadcast application is to be acquired by all apparatuses, the data broadcast application in question is executed only by either the receiving apparatus 23 or the external device 24.

[Operating Sequences]

Figure 16:
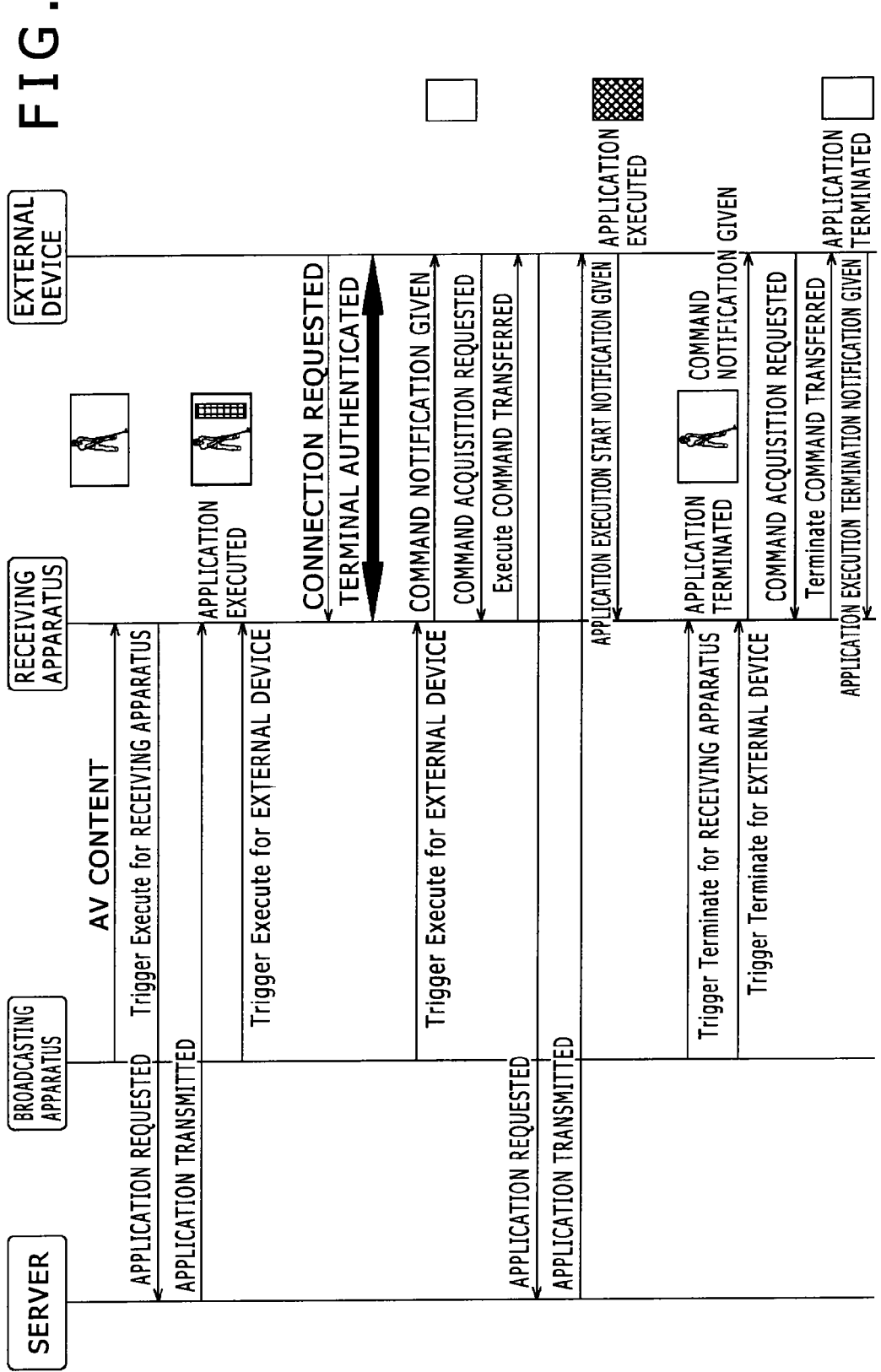
FIG. 16 is a schematic diagram showing a typical operating sequence in effect when different data broadcast application programs are acquired.
Figure 17:
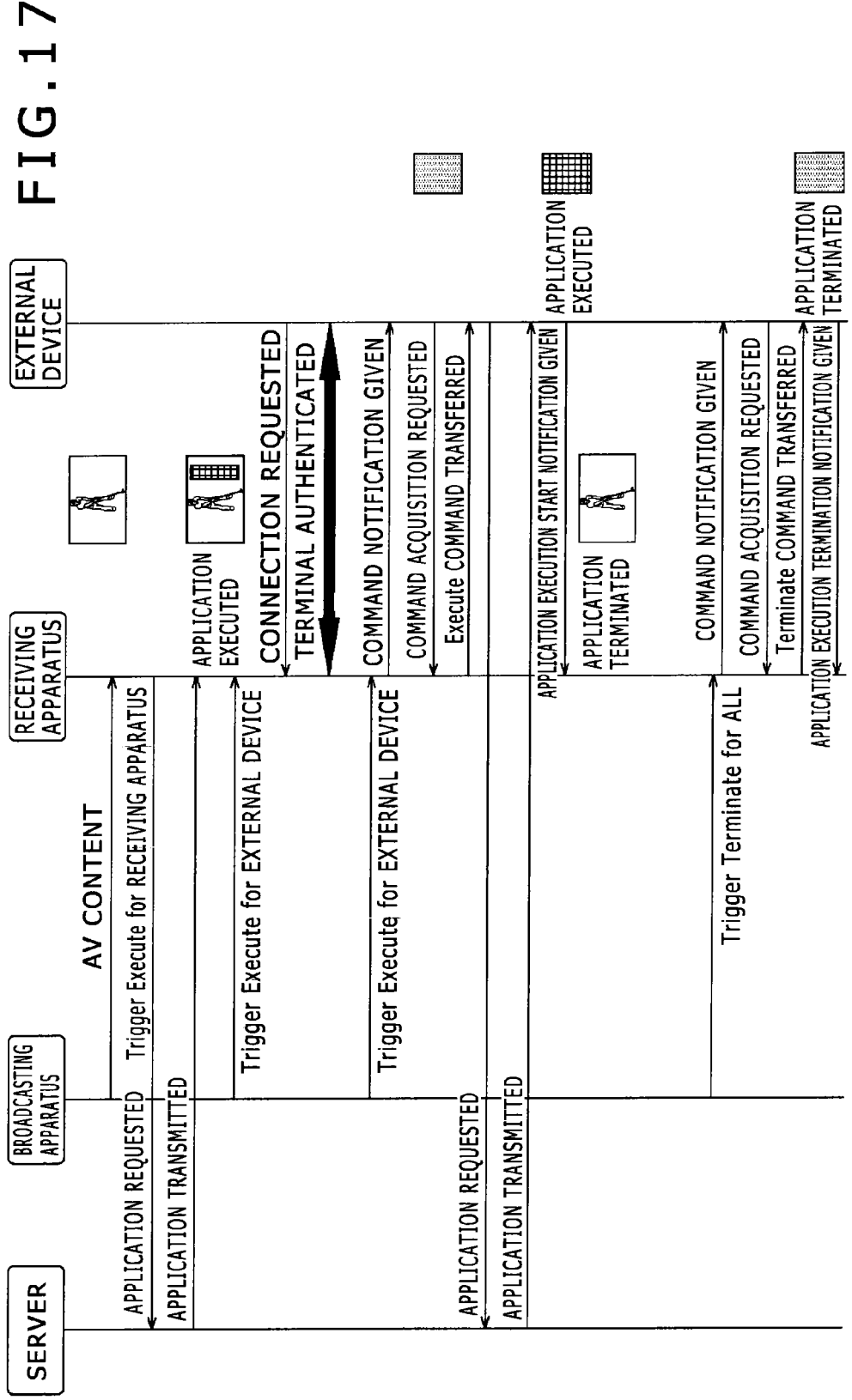
FIG. 17 is a schematic diagram showing a typical operating sequence in effect when the same data broadcast application program is acquired.

Explained below in reference to FIGS. 16 and 17 are the operations of the apparatuses making up the broadcasting system 1 where the above-described operating scenarios are carried out.

FIG. 16 is a schematic diagram showing a typical operating sequence in effect when different data broadcast application programs are acquired by different apparatuses.

While receiving AV content such as a TV program transmitted from the broadcasting apparatus 21, the receiving apparatus 23 may receive the trigger information constituting the execute command destined for the receiving apparatus proper. In that case, the receiving apparatus 23 requests the data broadcast application from the server 22 via the Internet 3. The receiving apparatus 23 acquires and executes the data broadcast application transmitted upon request from the server 22.

If the program data of the data broadcast application identified by the application ID ("App_id") has yet to be acquired (i.e., if the application is not in the cache memory 72) when the execute command is received, then the receiving apparatus 23 acquires and executes the program data.

Thereafter, the broadcasting apparatus 21 transmits the trigger information constituting the execute command to the external device. At this point, the external device 24 is not connected to the receiving apparatus 23. For this reason, the receiving apparatus 23 having received the execute command ignores the command.

Later, when the external device 24 is connected to the receiving apparatus 23 and sends a connection request thereto, a terminal authentication process is performed between the external device 24 and the receiving apparatus 23. Once the external device 24 is authenticated as a legitimate terminal through the terminal authentication process, it becomes possible for the commands destined for the external device from the broadcasting apparatus 21 to be transferred to the external device 24.

That is, if the broadcasting apparatus 21 again transmits the trigger information constituting the execute command destined for the external device, the receiving apparatus 23 notifies the external device 24 that the execute command destined for the external device has been received, and queries whether the external device 24 requests acquisition of the execute command. If the external device 24 requests acquisition of the execute command, the receiving apparatus 23 transfers the command to the external device 24.

Upon receipt of the execute command from the receiving apparatus 23, the external device 24 requests from the server 22 over the Internet 3 a data broadcast application different from the data broadcast application currently executed by the receiving apparatus 23. The external device 24 acquires and executes the data broadcast application transmitted upon request from the server 22. Also, the external device 24 notifies the receiving apparatus 23 that execution of the different data broadcast application has been started.

That is, the receiving apparatus 23 and the external device 24 execute a different data broadcast application each.

Thereafter, when the broadcasting apparatus 21 transmits the trigger information constituting the terminate command to the receiving apparatus proper, the receiving apparatus 23 terminates the currently executing data broadcast application. Also, when the broadcasting apparatus 21 transmits the trigger information constituting the terminate command destined for the external device 24, the receiving apparatus 23 queries whether the external device 24 requests acquisition of the command. If the external device 24 request acquisition of the terminate command, the receiving apparatus 23 transfers the command to the external device 24.

On receiving the terminate command transferred from the receiving apparatus 23, the external device 24 terminates the currently executing data broadcast application. Also, the external device 24 notifies the receiving apparatus 23 that execution of the data broadcast application has been terminated.

The foregoing description completes the explanation of the operating sequences in effect when different data broadcast applications are acquired by different apparatuses.

FIG. 17 is a schematic diagram showing a typical operating sequence in effect when the same data broadcast application program is acquired by all apparatuses.

The operating sequence shown in FIG. 17 is the same as that in FIG. 16 up to the point where the terminal authentication process is performed following the connection of the receiving apparatus 23 with the external device 24. The explanation of the operating sequence up to that point is thus omitted.

If the broadcasting apparatus 21 transmits the trigger information constituting the execute command destined for the external device after the external device 24 has been authenticated as a legitimate terminal through the terminal authentication process, the external device 24 may request acquisition of the execute command from the receiving apparatus 23. In that case, the receiving apparatus 23 transfers the execute command to the external device 24.

Upon receipt of the execute command from the receiving apparatus 23, the external device 24 requests from the server 22 over the Internet 3 the same data broadcast application as the application currently executed by the receiving apparatus 23. The external device 24 acquires and executes the data broadcast application transmitted upon request from the server 22. Also, the external device 24 notifies the receiving apparatus 23 that execution of the same data broadcast application has been started.

Based on the notification from the external device 24, the receiving apparatus 23 terminates the currently executing data broadcast application.

That is, the receiving apparatus 23 and the external device 24 will not execute the same data broadcast application at the same time. When the external device 24 starts executing the same data broadcast application, the receiving apparatus 23 terminates execution of the same application.

Later, when the broadcasting apparatus 21 transmits the trigger information constituting the terminate command to all apparatuses, the receiving apparatus 23 having received the trigger information ignores the command because the data broadcast application has already been terminated. Also, when the external device 24 requests acquisition of the terminate command from the receiving apparatus 23, the receiving apparatus 23 transfers the terminate command to the external device 24.

On receiving the terminate command transferred from the receiving apparatus 23, the external device 24 terminates the currently executing data broadcast application. Also, the external device 24 notifies the receiving apparatus 23 that execution of the data broadcast application has been terminated.

The foregoing description completes the explanation of the operating sequence of each apparatus when all apparatuses acquire the same data broadcast application.

Alternatively, in the operating sequences shown in FIGS. 16 and 17, the receiving apparatus 23 may forcibly transfer commands to the external device 24 without querying whether the external device 24 requests acquisition of the command of interest.

[Trigger Handling Process of the Receiving Apparatus]

Figure 18:
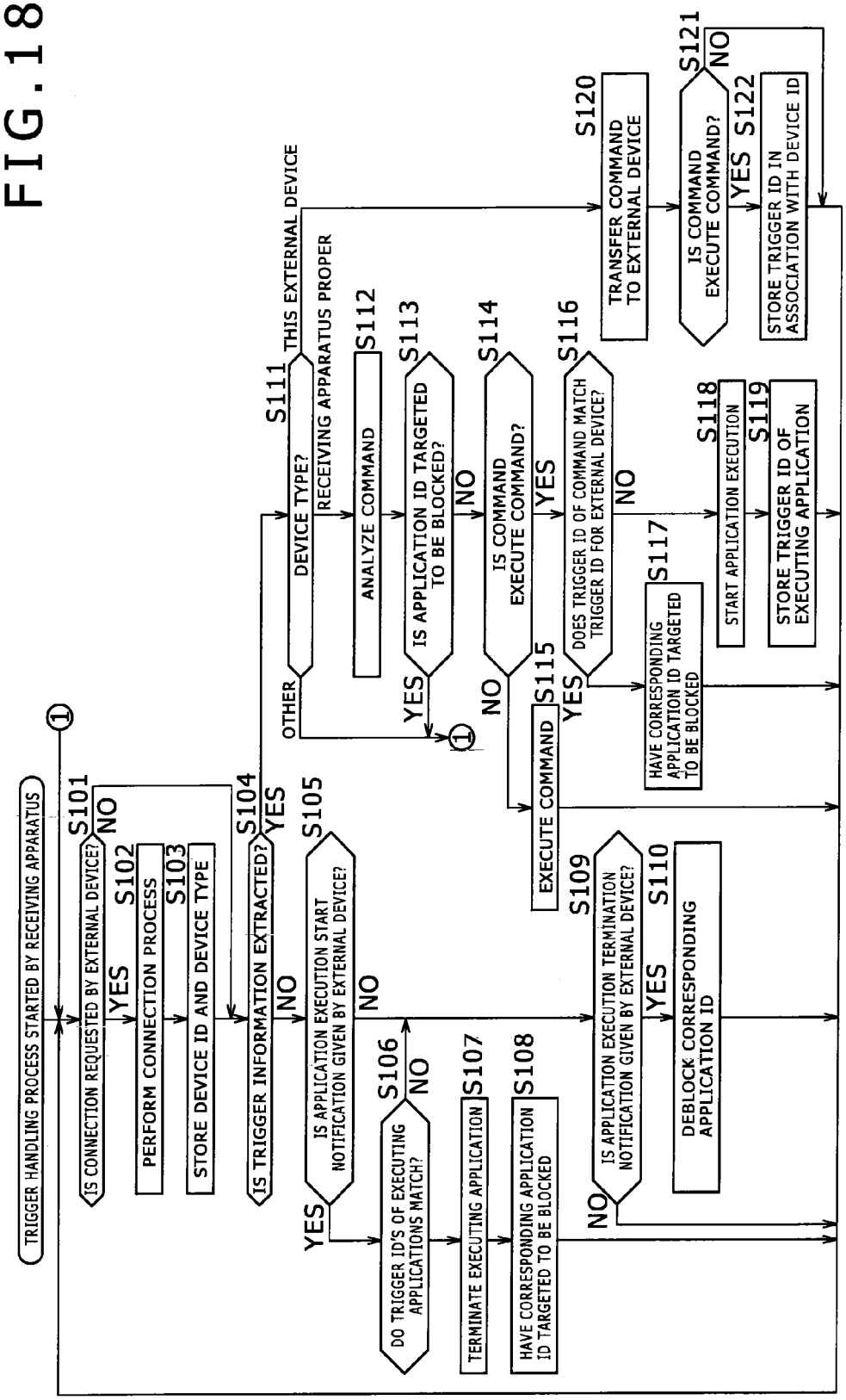
FIG. 18 is a flowchart explanatory of a trigger handling process performed by the receiving apparatus.

Explained below in reference to the flowchart of FIG. 18 is the trigger handling process performed by the receiving apparatus 23.

The trigger handling process of FIG. 18 may be carried out, for example, by the receiving apparatus 23 receiving AV content from the broadcasting apparatus 21 and getting content images displayed on a display device.

In step S101, the external device processing portion 83 controls the external interface 75 to determine whether the external device 24 has requested connection.

If in step S101 it is determined that the external device 24 is connected to the receiving apparatus 23 and that the external device 24 has requested connection with the receiving apparatus 23, control is passed on to step S102. In step S102, the external device processing portion 83 performs a connection process with the external device 24 by communicating therewith via the external interface 75. For example, the connection process may involve performing the terminal authentication process with the connected external device 24.

In step S103, the external device processing portion 83 acquires a device ID and a device type from the external device 24 authenticated as a legitimate terminal through the terminal authentication process for example, and records external device information associating the device ID with the device type to the memory 69. Incidentally, the device ID is an identifier that identifies the connected device, and the device type is information that indicates the type of the device in question.

If in step S101 it is determined that the external device 24 does not request connection, then steps S102 and S103 are skipped, and control is passed on to step S104.

In step S104, the trigger extraction portion 81 attempts to extract trigger information as part of the AV content transmitted from the broadcasting apparatus 21, and determines whether the trigger information has been extracted.

If in step S104 it is determined that the trigger information is not extracted, control is passed on to step S105. In step S105, the external device processing portion 83 controls the external interface 75 to determine whether the connected external device 24 has notified that execution of the data broadcast application has been started.

If in step S105 it is determined that the application execution start notification is not given, control is passed on to step S109. In step S109, the external device processing portion 83 controls the external interface 75 to determine whether the connected external device 24 has notified that execution of the data broadcast application has been terminated.

If in step S109 the application execution termination notification is not given, then control is returned to step S101, and the subsequent steps are repeated. Later, if it is determined in step S104 that the trigger information has been extracted, control is passed on to step S111.

In step S111, the trigger analysis portion 82 determines whether the device type targeted by the command included in the received trigger information points to the receiving apparatus proper, the connected external device, or some other device.

The device type is determined by the "Target_device_type" included in each of the above-described commands. Whether or not the device in question is the connected external device may be determined, for example, by checking to see if the device type which is part of the external device information stored into the memory 69 in step S103 and which applies to the connected external device 24 matches the target device type. Thus some other device means any device other than the receiving apparatus 23 or the external device 24.

If in step S111 the device type points to some other device, control is returned to step S101 and the subsequent steps are repeated. For example, if any command destined for a disconnected external device or for some other device is received, the receiving apparatus 23 ignores the received command.

If in step S111 it is determined that the device type points to the receiving apparatus proper, control is passed on to step S112. In step S112, the trigger analysis portion 82 analyzes the command included in the received trigger information.

In step S113, the trigger analysis portion 82 determines whether the application ID ("App_id") of the analyzed command is targeted to be blocked (i.e., whether this data broadcast application is blocked from execution by the receiving apparatus 23). If it is determined in step S113 that the application ID is targeted to be blocked, the command is not executed. Control is then returned to step S101, and the subsequent steps are repeated.

If it is determined in step S113 that the application ID is not targeted to be blocked, control is passed on to step S114. In step S114, the trigger analysis portion 82 determines whether the command included in the trigger information is the execute command based on the result of the analysis in step S112.

If it is determined in step S114 that the command is the execute command, control is passed on to step S116. In step S116, by referencing the external device information stored in the memory 69, the trigger analysis portion 82 determines whether the trigger ID ("Trigger_id") of the execute command matches the trigger ID of the trigger information destined for the external device being connected.

If it is determined that the trigger ID of the execute command is different from the trigger ID of the trigger information destined for the external device, control is passed on to step S118. For example, if the trigger information destined for the connected external device has yet to be received, it is determined that the two trigger IDs are different.

In step S118, under control of the apparatus proper control portion 68, the application engine 73 starts executing the application. Specifically, the application engine 73 controls the communication interface 71 to acquire from the server 22 over the Internet 3 the data of the data broadcast application identified by the application ID ("App_id") of the trigger information, and starts to execute the acquired data broadcast application.

In step S119, the apparatus proper control portion 68 records to the memory 69 the trigger ID of the currently executing data broadcast application. Thereafter, control is returned to step S101 and the subsequent steps are repeated.

If a command other than the execute command is transmitted from the broadcasting apparatus 21 as a command destined for the receiving apparatus proper, that command is determined to be a command other than the execute command in step S114, and control is passed on to step S115. In step S115, under control of the apparatus proper control portion 68, the application engine 73 performs the process corresponding to the command. For example, if the trigger information constituting the suspend command is received, the currently executing data broadcast application is suspended.

If in step S111 the device type points to the external device being connected, control is passed on to step S120. In step S120, the external device processing portion 83 controls the external interface 75 to transfer to the external device 24 the command included in the received trigger information and destined for the external device. In turn, the external device 24 acquires and executes the data broadcast application corresponding to the command.

Although not described above for purpose of simplification, the external device 24 may be queried whether or not to acquire the command before the command is transmitted thereto, as explained earlier.

In step S121, the trigger analysis portion 82 determines whether the command transferred to the external device 24 is the execute command. If it is determined in step S121 that the transferred command is the execute command, control is passed on to step S122.

In step S122, the trigger analysis portion 82 records to the memory 69 the trigger ID of the trigger information constituting the execute command in association with the device ID of the connected external device 24. Since the external device information having the device ID associated with the device type was recorded to the memory 69 in step S103, the device ID included in the external device information is further associated with the trigger ID in step S122.

That is, upon transfer of the execute command, the trigger ID of the trigger information constituting the command is recorded in association with the device ID of the destination of the transfer. Thereafter, if the execute command destined for the receiving apparatus proper is received and if the trigger ID of the trigger information constituting the received execute command matches the trigger ID of the trigger information making up the execute command transferred to the external device 24 as the destination of the transfer ("YES" in step S116), then the application ID in question may be targeted to be blocked (in step S117). This prevents the receiving apparatus 23 from executing the data broadcast application targeted to be blocked and currently executed by the external device 24.

Upon completion of step S117 or S122, control is returned to step S101 and the subsequent steps are repeated.

Having started to execute the data broadcast application, the external device 24 notifies the receiving apparatus 23 of the start of application execution. In step S105, it is determined that the application execution start notification has been given. Control is then passed on to step S106.

In step S106, the trigger analysis portion 82 determines whether the trigger ID of the data broadcast application currently executed by the external device 24 having given the application execution start notification matches the trigger ID of the data broadcast application currently executed by the receiving apparatus 23.

If in step S106 it is determined that the trigger IDs match, then control is passed on to step S107. In step S107, the application engine 73 under control of the apparatus proper control portion 68 terminates the currently executing data broadcast application.

In step S108, the trigger analysis portion 82 gets the application ID corresponding to the data broadcast application currently executed by the external device 24 data broadcast application whose execution was terminated by the receiving apparatus 23) targeted to be blocked, so that the receiving apparatus 23 will not execute the data broadcast application currently executed by the external device 24.

That is, if the receiving apparatus 23 and external device 24 have acquired the same data broadcast application, then the receiving apparatus 23 is caused to terminate the currently executing data broadcast application and only the external device 24 is allowed to execute its data broadcast application.

Upon completion of step S108, control is returned to step S101 and the subsequent steps are repeated.

If in step S106 it is determined that the trigger IDs do not match, steps S107 and S108 are skipped. Control is then passed on to step S109.

That is, if the receiving apparatus 23 and external device 24 have acquired different data broadcast applications, the receiving apparatus 23 and external device 24 are allowed to execute their different data broadcast applications.

Later, upon terminating execution of the data broadcast application, the external device 24 notifies the receiving apparatus 23 of the termination of application execution. In step S109, it is determined that the application execution termination notification has been given. Control is then passed on to step S110.

In step S110, the trigger analysis portion 82 deblocks the application ID corresponding to the data broadcast application of which the execution was terminated by the external device 24 having given the application execution termination notification, so that the receiving apparatus 23 can execute the data broadcast application whose execution was terminated by the external device 24.

Upon completion of step S110, control is returned to step S101, and the subsequent steps are repeated.

The foregoing description completes the explanation of the trigger information handling process performed by the receiving apparatus 23.

According to the above-described trigger information handling process performed by the receiving apparatus 23, the receiving apparatus proper can execute, fire an event in, or terminate its data broadcast application in keeping with AV content such as a TV program. Also, the external device can execute, fire an event in, or terminate its data broadcast application in keeping with AV content such as the TV program.

[Trigger Handling Process of the External Device]

Figure 19:
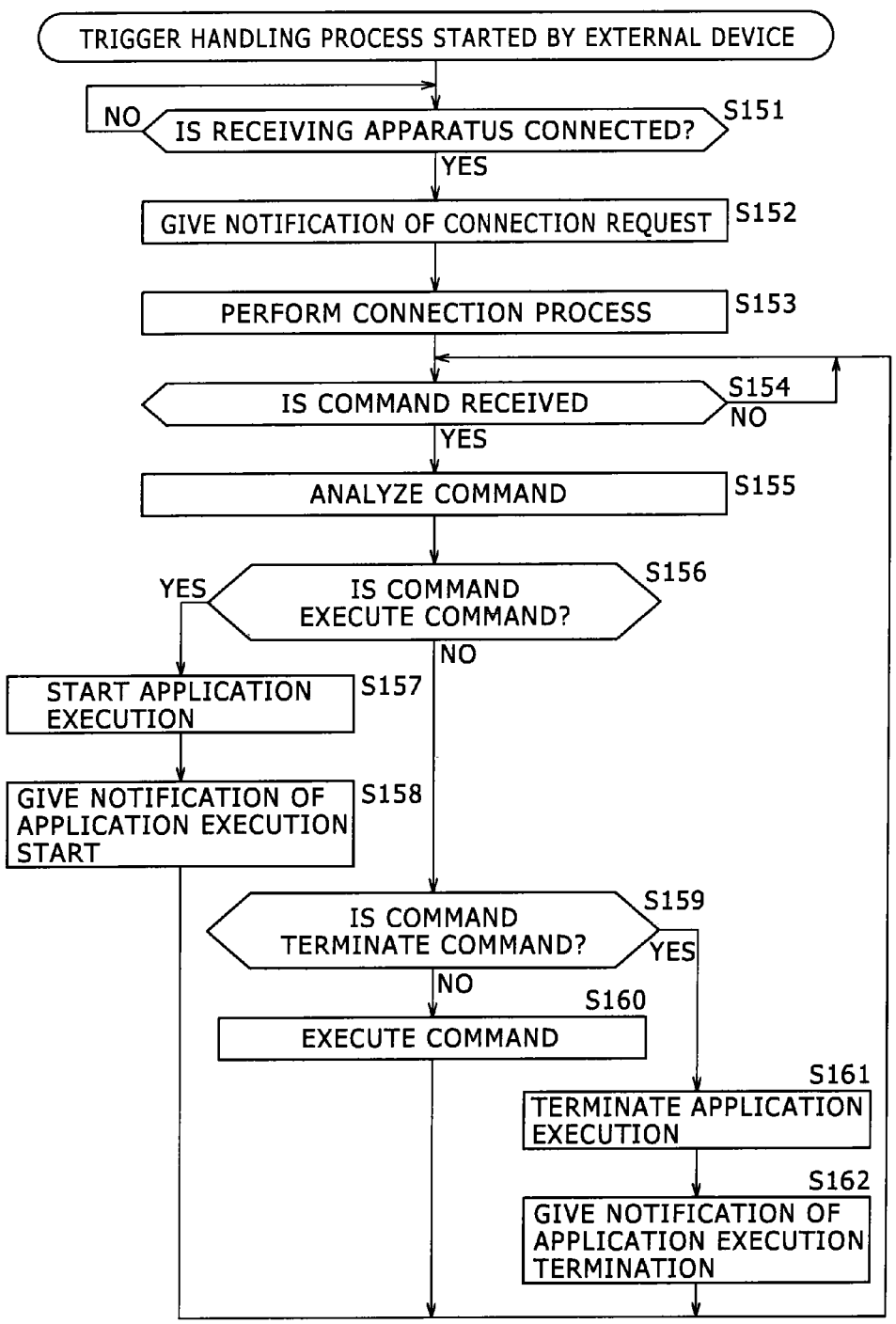
FIG. 19 is a flowchart explanatory of a trigger handling process performed by the external device.

Explained below in reference to the flowchart of FIG. 19 is the trigger handling process performed by the external device 24.

In step S151, the control portion 93 controls the external interface 91 to determine whether the external device is connected to the receiving apparatus 23. If in step S151 it is determined that the external device is connected to the receiving apparatus 23, control is passed on to step S152.

In step S152, the control portion 93 controls the external interface 91 to give a connection request to the receiving apparatus 23. In step S153, the control portion 93 communicates with the receiving apparatus 23 via the external interface 91 in order to carry out a connection process with the receiving apparatus 23. For example, the connection process may involve having the terminal authentication process carried out between the receiving apparatus 23 and the external device 24.

In step S154, the control portion 93 controls the external interface 91 to determine whether any command transferred from the receiving apparatus 23 is received. If in step S154 it is determined that no command is received, then the determination process of step S154 is repeated.

If in step S154 it is determined that a command has been received, control is passed on to step S155. In step S155, the command analysis portion 92 analyzes the command received from the receiving apparatus 23.

In step S156, the command analysis portion 92 determines whether the received command is the execute command based on the result of the analysis in step S155. If it is determined in step S156 that the received command is the execute command, control is passed on to step S157.

In step S157, the application engine 96 starts executing the application under control of the control portion 93. Specifically, the application engine 96 controls the communication interface 97 to acquire from the server 22 over the Internet 3 the data of the data broadcast application identified by the application ID ("App_id"), and starts to execute the data broadcast application.

In step S158, the control portion 93 controls the external interface 91 to notify the receiving apparatus 23 of the start of application execution. Upon completion of step S158, control is returned to step S154 and the subsequent steps are repeated.

If in step S156 it is determined that the received command is a command other than the execute command, control is passed on to step S159. In step S159, the command analysis portion 92 determines whether the received command is the terminate command based on the result of the analysis in step S155.

If in step S159 it is determined that the received command is not the terminate command, i.e., that the received command is a command other than the execute command or terminate command, then control is passed on to step S160. In step S160, the application engine 96 performs the process corresponding to the received command under control of the control portion 93. For example, if the trigger information constituting the suspend command is received, the currently executing data broadcast application is suspended. Upon completion of step S160, control is returned to step S154 and the subsequent steps are repeated.

If in step S159 it is determined that the received command is the terminate command, control is passed on to step S161. In step S161, the application engine 96 terminates the currently executing data broadcast application under control of the control portion 93.

In step S162, the control portion 93 controls the external interface 91 to notify the receiving apparatus 23 of the termination of application execution. Upon completion of step S162, control is returned to step S154 and the subsequent steps are repeated.

The foregoing description completes the explanation of the trigger information handling process performed by the external device 24.

According to the above-described trigger information handling process of the external device 24, the external device can execute, fire an event in, or terminate its data broadcast application in keeping with AV content such as a TV program under control of the receiving apparatus proper.

Figure 20:
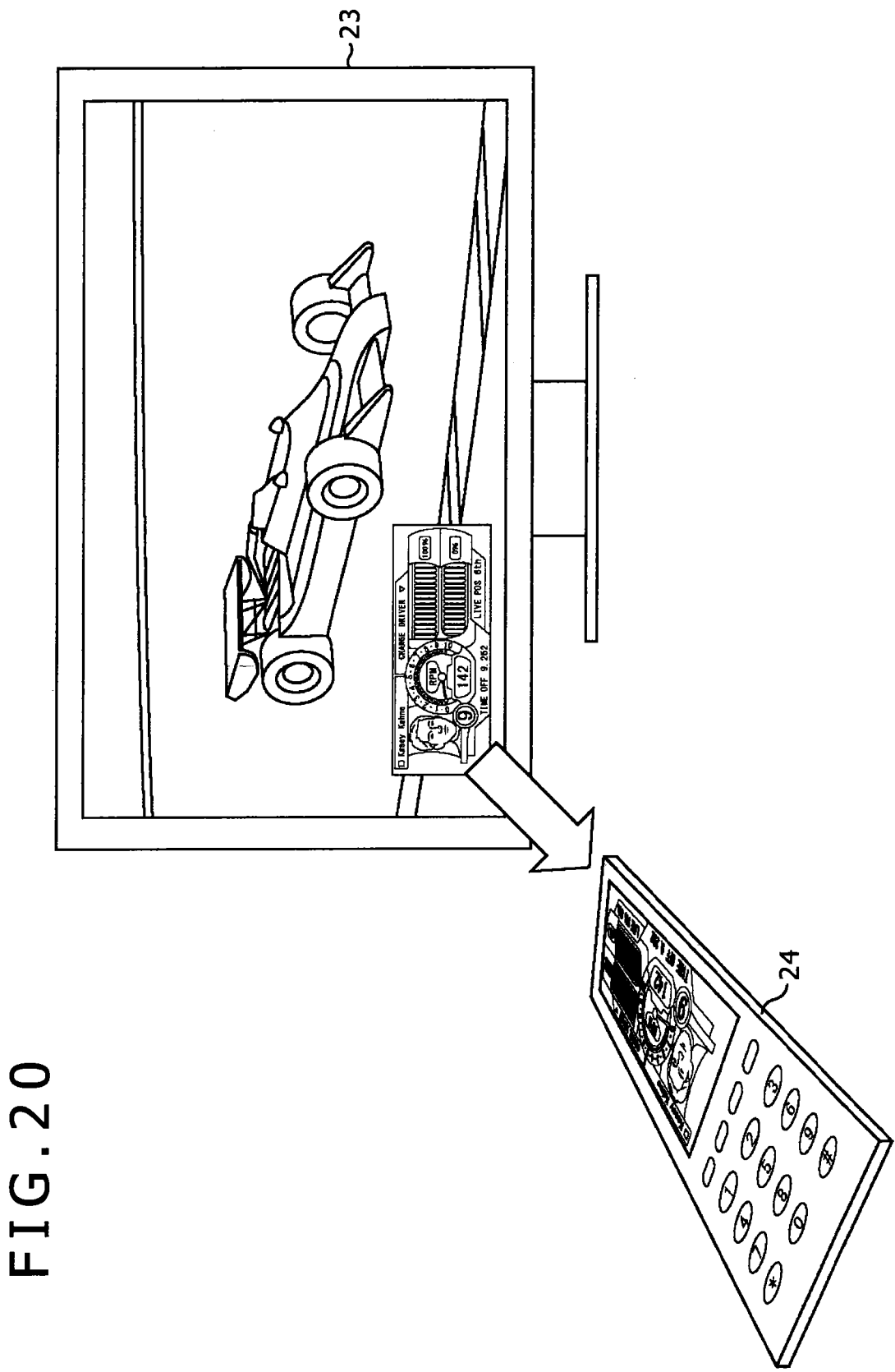
FIG. 20 is a schematic view showing typical coordination between data broadcast application programs.

FIG. 20 is a schematic view showing typical coordination between data broadcast applications performed by the receiving apparatus 23 and external device 24.

As shown in FIG. 20, a display device of the receiving apparatus 23 displays an image of the TV content being received from the broadcasting apparatus 21. In the bottom left corner of the displayed image appears an image of the data broadcast application in overlapping fashion. If the external device 24 is connected to the receiving apparatus 23 and if the receiving apparatus has received a command for causing the external device 24 to execute the data broadcast application currently executed by the receiving apparatus 23, that command is transferred to the external device 24.

Based on the command transferred from the receiving apparatus 23, the external device 24 acquires from the server 22 over the Internet 3 the same data broadcast application as the application currently executed by the receiving apparatus 23, and executes the acquired data broadcast application. This causes the screen of the external device 24 to display the same image as that of the data broadcast application displayed in the bottom left corner on the display of the receiving apparatus 23.

Also, when the image of the data broadcast application is displayed on the screen of the external device 24, the image of the data broadcast application displayed in overlapping fashion on the receiving apparatus 23 disappears, leaving only the image of the AV content displayed.

The foregoing example was one in which the same data broadcast application is acquired by each apparatus. In another example, as explained above, the receiving apparatus 23 and external device 24 may acquire different data broadcast applications. In this case, the receiving apparatus 23 and external device 24 execute a different data broadcast application each.

In the manner described above, the external device 24 connected to the receiving apparatus 23 may be operated in conjunction with the progress of AV content.

[Typical Structure of the Computer]

The series of the processes described above may be executed either by hardware or by software. Where the processes are to be carried out by software, the programs constituting the software may be either incorporated beforehand in the dedicated hardware of the computer to be used or installed from a suitable program recording medium into a general-purpose personal computer or like equipment capable of executing diverse functions based on the installed programs.

FIG. 21 is a schematic view showing a typical structure of a computer for executing the series of the above-described processes using programs.

In this computer 200, a CPU (central processing unit) 201, a ROM (read only memory) 202, and a RAM (random access memory) 203 are interconnected by a bus 204.

An input/output interface 205 is further connected to the bus 204. The input/output interface 205 is connected with an input device 206 generally made up of a keyboard, a mouse, a microphone and the like; an output device 207 usually composed of a display unit, speakers and the like; a storage device 208 formed by a hard disk or a nonvolatile memory, for example; a communication device 209 constituted by a network interface or the like; and a drive 210 for driving removable media such as magnetic disks, optical disks, magneto-optical disks, or semiconductor memories.

In the computer structured as outlined above, the CPU 201 may carry out the series of the above-described processes by loading the programs from the storage device 208 into the RAM 203 for execution via the input/output interface 205 and bus 204, for example.

Also, the programs for execution by the computer may be processed in the depicted sequence of this specification (i.e., on a time series basis), in parallel, or in otherwise appropriately timed fashion such as when they are invoked.

The programs may be processed by a single computer or by a plurality of computers on a distributed basis. The program may also be transferred to a remote computer or computers for execution.

In this specification, the term "system" refers to an entire configuration made up of a plurality of component devices.

It should be understood that the present technology when embodied is not limited to the above-described embodiments and that various modifications, variations and alternatives may be made of the technology so far as they are within the scope of the appended claims or the equivalents thereof.

Furthermore, the present technology can be structured as follows.

[1]

A receiving apparatus including:

a reception portion configured to receive AV content being transmitted;

a trigger extraction portion configured to extract trigger information for controlling an application program for execution either by the receiving apparatus proper or by an external device connected thereto in conjunction with the AV content, the application program being transmitted along with the AV content;

an apparatus proper control portion configured such that if a command indicated by the extracted trigger information is destined for the receiving apparatus proper, the apparatus proper control portion controls performance of the application program in accordance with the command; and an external device processing portion configured such that if the command indicated by the extracted trigger information is destined for the external device, the external device processing portion transfers the command to the external device.

[2]

The receiving apparatus according to paragraph [1] above, wherein, if the application program executed by the external device is the same as the application program currently executed by the receiving apparatus proper, then the apparatus proper control portion terminates the application program currently executed by the receiving apparatus proper.

[3]

The receiving apparatus according to paragraph [1] or [2] above, wherein, if the application program executed by the external device is different from the application program currently executed by the receiving apparatus proper, then the apparatus proper control portion allows the receiving apparatus proper to continue executing the currently executing application program.

[4]

The receiving apparatus according to any one of paragraphs [1] through [3] above, wherein the apparatus proper control portion exercises control so that the receiving apparatus proper does not execute the same program as the application program currently executed by the external device.

[5]

The receiving apparatus according to any one of paragraphs [1] through [4] above, wherein the command indicated by the trigger information includes information for designating a specific device or part of or all of the devices that may be targeted by the command.

[6]

The receiving apparatus according to any one of paragraphs [1] through [5] above, wherein the trigger information includes one of the commands to acquire, register, start, fire an event in, suspend, and terminate a predetermined application program.

[7]

The receiving apparatus according to paragraph [6] above, wherein, in accordance with each of the commands, the apparatus proper control portion exercises control so as to acquire, register, or start the application program; or to fire an event in, suspend, or terminate the currently executing application program.

[8]

The receiving apparatus according to paragraph [6] or [7], wherein the external device processing portion transfers to the external device the command to acquire, register, or start the application program; or to fire an event in, suspend, or terminate the currently executing application program.

[9]

A receiving method for use with a receiving apparatus, the receiving method including:

causing the receiving apparatus to receive AV content being transmitted;

causing the receiving apparatus to extract trigger information for controlling an application program for execution either by the receiving apparatus proper or by an external device connected thereto in conjunction with the AV content, the application program being transmitted along with the AV content;

if a command indicated by the extracted trigger information is destined for the receiving apparatus proper, then causing the receiving apparatus to control performance of the application program in accordance with the command; and if the command indicated by the extracted trigger information is destined for the external device, then causing the receiving apparatus to transfer the command to the external device.

[10]

A program for causing a program to function as:

a reception portion configured to receive AV content being transmitted;

a trigger extraction portion configured to extract trigger information for controlling an application program for execution either by a receiving apparatus proper or by an external device connected thereto in conjunction with the AV content, the application program being transmitted along with the AV content;

an apparatus proper control portion configured such that if a command indicated by the extracted trigger information is destined for the receiving apparatus proper, the apparatus proper control portion controls performance of the application program in accordance with the command; and an external device processing portion configured such that if the command indicated by the extracted trigger information is destined for the external device, the external device processing portion transfers the command to the external device.

What is claimed is:

1. A receiving apparatus comprising:
    means for receiving audio-visual content being transmitted;
    means for extracting trigger information for controlling a downloaded application program for execution either by said receiving apparatus or by an external device connected thereto in conjunction with said audio-visual content;
    means for determining a destination of a command, which is indicated by the extracted trigger information, based on a destination attribute associated with the command;
    means for controlling performance of said downloaded application program in accordance with said command when the destination is determined to be said receiving apparatus; and
    means for transferring said command to said external device when the destination is determined to be said external device, wherein said external device controls performance of said downloaded application program in accordance with said command.

2. A receiving apparatus comprising:
    circuitry to
        receive audio-visual content being transmitted,
        extract trigger information for controlling a downloaded application program for execution either by said receiving apparatus or by an external device connected thereto in conjunction with said audio-visual content,
        determine a destination of a command, which is indicated by the extracted trigger information, based on a destination attribute associated with the command,
        when the destination is determined to be said receiving apparatus, control performance of said downloaded application program in accordance with said command, and
        when the destination is determined to be said external device, transfer said command to said external device, wherein said external device controls performance of said downloaded application program in accordance with said command.

3. The receiving apparatus according to claim 2, wherein, when said application program executed by said external device is different from the application program currently executed by said receiving apparatus, said circuitry allows said receiving apparatus to continue executing the currently executing application program.

4. The receiving apparatus according to claim 2, wherein said circuitry exercises control so that said receiving apparatus does not execute the same program as said application program currently executed by said external device.

5. The receiving apparatus according to claim 2, wherein said command indicated by said trigger information includes destination information for designating a specific device or part of or all of the devices that may be targeted by said command.

6. The receiving apparatus according to claim 2, wherein said trigger information includes one of the commands to acquire, register, start, fire an event in, suspend, and terminate a predetermined application program.

7. The receiving apparatus according to claim 6, wherein, in accordance with each of the commands, said circuitry exercises control so as to acquire, register, or start said application program; or to fire an event in, suspend, or terminate the currently executing application program.

8. The receiving apparatus according to claim 6, wherein said circuitry transfers to said external device the command to acquire, register, or start said application program; or to fire an event in, suspend, or terminate the currently executing application program.

9. A receiving method for use with a receiving apparatus, said receiving method comprising:
    causing circuitry of said receiving apparatus to receive audio-visual content being transmitted;
    causing said circuitry of said receiving apparatus to extract trigger information for controlling a downloaded application program for execution either by said receiving apparatus or by an external device connected thereto in conjunction with said audio-visual content;

causing said circuitry of said receiving apparatus to determine a destination of a command, which is indicated by the extracted trigger information, based on a destination attribute associated with the command;

when the destination is determined to be said receiving apparatus, causing said receiving apparatus to control performance of said downloaded application program in accordance with said command; and when the destination is determined to be said external device, causing said receiving apparatus to transfer said command to said external device, wherein said external device controls performance of said downloaded application program in accordance with said command.

10. A non-transitory computer-readable storage medium storing a program which when executed by a computer causes the computer to perform the method according to claim 9.

11. The receiving apparatus according to claim 2, wherein, when said application program executed by said external device is the same as the application program currently executed by said receiving apparatus, said circuitry terminates said application program currently executed by said receiving apparatus.

12. The receiving apparatus according to claim 2, wherein the circuitry
    determines whether the command indicated by the extracted trigger information is destined for said receiving apparatus or said external device based on the determined destination,
    when the command indicated by the extracted trigger information is determined to be destined for said receiving apparatus, controls performance of said application program in accordance with said command, and
    when the command indicated by the extracted trigger information is determined to be destined for said external device, transfers said command to said external device.

13. The receiving apparatus according to claim 2, wherein the circuitry receives a digital television broadcast signal including the audio-visual content.

14. The receiving apparatus according to claim 2, wherein said application program is transmitted along with said audio-visual content.

15. The receiving apparatus according to claim 2, wherein the circuitry receives the command and the destination attribute from an external source.

* * * * *